United States Patent
Okachi et al.

(10) Patent No.: US 10,822,868 B2
(45) Date of Patent: Nov. 3, 2020

(54) ELECTRIC SCREEN DEVICE

(71) Applicant: METACO, INC., Tokyo (JP)

(72) Inventors: Yasubumi Okachi, Kanagawa (JP); Yuichiro Nishioka, Kanagawa (JP); Kazumasa Noda, Kanagawa (JP)

(73) Assignee: METACO, INC., Tokyo (JP)

(*) Notice: Subject to any disclaimer, the term of this patent is extended or adjusted under 35 U.S.C. 154(b) by 290 days.

(21) Appl. No.: 15/763,616

(22) PCT Filed: Oct. 27, 2016

(86) PCT No.: PCT/JP2016/081918
§ 371 (c)(1),
(2) Date: Mar. 27, 2018

(87) PCT Pub. No.: WO2017/090370
PCT Pub. Date: Jun. 1, 2017

(65) Prior Publication Data
US 2018/0305976 A1  Oct. 25, 2018

(30) Foreign Application Priority Data
Nov. 24, 2015 (JP) ................. 2015-228435

(51) Int. Cl.
*E06B 9/06* (2006.01)
*E06B 9/262* (2006.01)
(Continued)

(52) U.S. Cl.
CPC .......... *E06B 9/0692* (2013.01); *E05F 15/665* (2015.01); *E06B 9/02* (2013.01);
(Continued)

(58) Field of Classification Search
CPC ....... E06B 2009/543; E06B 2009/2625; E06B 9/0692; E06B 9/06; E06B 9/02;
(Continued)

(56) References Cited

U.S. PATENT DOCUMENTS 4,359,081 A    11/1982  Brower
5,675,231 A    10/1997  Becerra et al.
(Continued)

FOREIGN PATENT DOCUMENTS

EP    2085562 A2 *  8/2009  ............... E06B 9/52
EP    2103773 A2     9/2009
(Continued)

OTHER PUBLICATIONS

International Search Report for PCT Patent App. No. PCT/JP2016/081918 (dated Dec. 13, 2016) with English language translation thereof.

(Continued)

*Primary Examiner* — Johnnie A. Shablack
(74) *Attorney, Agent, or Firm* — Cermak Nakajima & McGowan LLP; Tomoko Nakajima

(57) ABSTRACT

This electric screen device is provided with an electric motor that causes slidable screen mounting frame part(s) to automatically slide. Torque generated by rotation of a rotation shaft of the electric motor is transmitted to a tension member that is provided inside the screen mounting frame parts, that connects screen guiding frame parts to each other at free ends thereof, and that forms a loop. The tension member moves in a state of being hung around the folded portions which apply tension to the tension member. The slidable screen mounting frame part(s) automatically slide in association with movement of the tension member. Thus, the screen automatically opens and closes.

6 Claims, 14 Drawing Sheets

(51) Int. Cl.
 *E05F 15/665* (2015.01)
 *E06B 9/02* (2006.01)
 *E06B 9/322* (2006.01)

(52) U.S. Cl.
 CPC .............. *E06B 9/262* (2013.01); *E06B 9/322* (2013.01); *E05Y 2900/13* (2013.01); *E06B 2009/2625* (2013.01)

(58) Field of Classification Search
 CPC .... E06B 9/262; E06B 9/58; E06B 9/54; E05F 15/665; E05Y 2900/13
 See application file for complete search history.

(56) References Cited

U.S. PATENT DOCUMENTS

| | | | | |
|---|---|---|---|---|
| 6,186,212 | B1 | 2/2001 | Tsuchida | |
| 6,533,017 | B1* | 3/2003 | Toti | E06B 9/262 160/168.1 V |
| 7,694,711 | B2* | 4/2010 | Okachi | E06B 9/54 160/122 |
| 7,726,377 | B2* | 6/2010 | Okachi | E06B 9/52 160/84.03 |
| 7,963,312 | B2* | 6/2011 | Okachi | E06B 9/262 160/31 |
| 8,082,969 | B2* | 12/2011 | Okachi | E06B 9/262 160/84.06 |
| 8,191,601 | B2* | 6/2012 | Okachi | E06B 9/54 160/122 |
| 8,316,912 | B2* | 11/2012 | Okachi | E06B 9/52 160/379 |
| 8,925,614 | B2* | 1/2015 | Okachi | E06B 9/54 160/31 |
| 9,004,138 | B2* | 4/2015 | Okachi | E06B 9/54 160/31 |
| 9,487,986 | B2* | 11/2016 | Okachi | E06B 9/54 |
| 10,041,294 | B2* | 8/2018 | Van Loosbroek | E06B 9/522 |
| 2011/0203752 | A1* | 8/2011 | Okachi | E06B 9/54 160/372 |
| 2014/0048219 | A1* | 2/2014 | Knowles | E06B 9/327 160/331 |
| 2018/0305976 | A1* | 10/2018 | Okachi | H02P 7/29 |
| 2019/0119979 | A1* | 4/2019 | Toda | E06B 9/54 |

FOREIGN PATENT DOCUMENTS

| | | | | |
|---|---|---|---|---|
| EP | 2469009 | A1 * | 6/2012 | ............. E06B 9/54 |
| EP | 2746524 | A1 | 6/2014 | |
| JP | 4-122198 | U | 11/1992 | |
| JP | 4-134393 | U | 12/1992 | |
| JP | 8-240087 | A | 9/1996 | |
| JP | 10-280837 | A | 10/1998 | |
| JP | 2001-073655 | A | 3/2001 | |
| JP | 2012-148706 | A | 8/2012 | |
| WO | WO2004/007890 | A1 | 1/2004 | |
| WO | WO-2013064308 | A1 * | 5/2013 | ............. E06B 9/58 |
| WO | WO-2015079267 | A1 * | 6/2015 | ............. E06B 9/54 |

OTHER PUBLICATIONS

Extended European Search Report for European Patent App. No. 16868319.1 (dated Feb. 6, 2020).

* cited by examiner

FIG.8
(a) 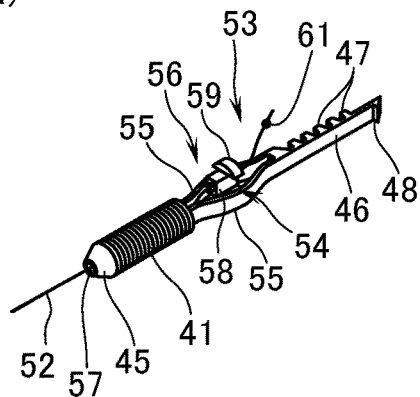
(b) 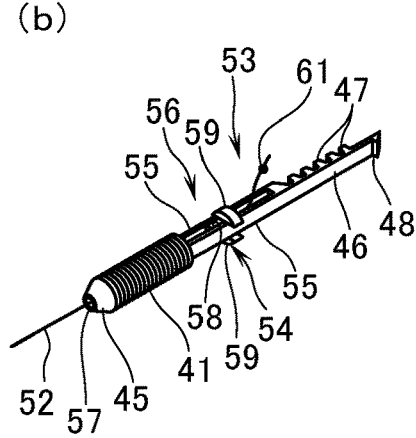
(c) 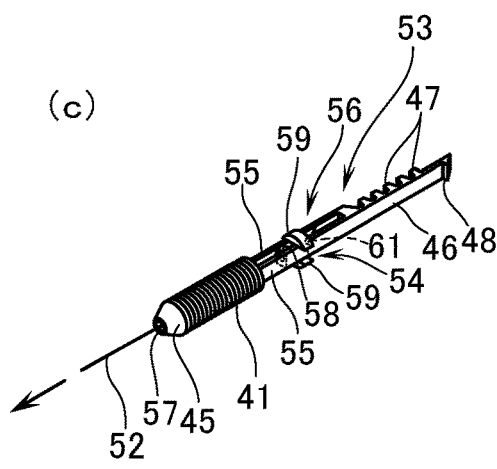
(d) 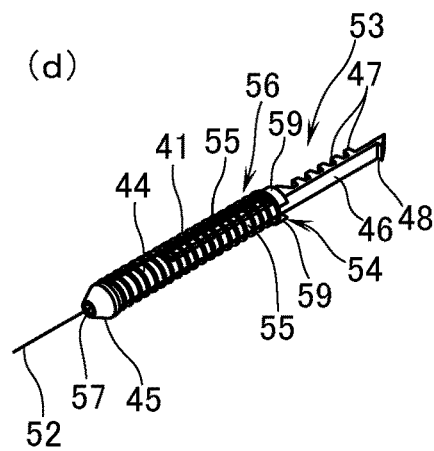
(e) 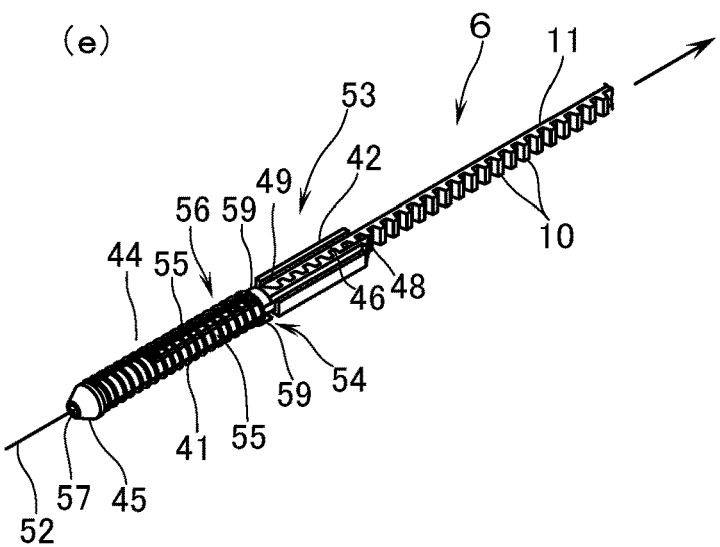

ELECTRIC SCREEN DEVICE

This application is a national phase entry under 35 U.S.C. § 371 of PCT Patent Application No. PCT/JP2016/081918, filed on Oct. 27, 2016, which claims priority under 35 U.S.C. § 119 to Japanese Patent Application No. 2015-228435, filed Nov. 24, 2015, both of which are incorporated by reference.

TECHNICAL FIELD

The present invention relates to an electric screen device.

BACKGROUND ART

The applicant has proposed and provided various screen devices which solve restrictions of installation when using the screen devises as a shading and diming device such as a curtain and a blind, and a mesh door and a partition, and which realize excellent operations and shape stabilities of a screen.

One of the screen devices is disclosed in the Japanese Patent Publication No. 2001-073655A. In the screen device, a tension member forming a loop having a shape of numeral 8 is provided with an end portion of the screen inside a slidable screen mounting frame part(s). The tension member connects each free end of a pair of slide guiding frame parts which are receivable and drawable inside the screen mounting frame part(s). In the screen device as above-mentioned, folded portions of the tension member is provided at an opposite side to a screen mounting side across the slide guiding frame parts in the screen mounting frame parts. Received portions of the slide guiding frame parts in the screen mounting frame part(s) intervene between the screen mounting side and the opposite side to the screen mounting side. The tension member is given tension by hooking the tension member around the folded portions.

Since the tension member forming the loop having the shape of numeral 8 connects the pair of the slide guiding frame parts at each of the free ends of the slide guiding frame parts, both of the slide guiding frame portions are smoothly received in or drawn from an inside of the screen mounting frame parts. As a result, the screen mounting frame parts smoothly move in parallel by users' operations at any portions in a longitudinal direction of the screen mounting frame parts.

SUMMARY OF INVENTION

Technical Problem

On the other hand, all of the conventional screen devices are manually operated and any of electric screen devices of which the screen can automatically open and close has not been developed. Almost all of the users such as handicapped or aged people ought to hope to realize an electric screen device. Under consideration of the electric screen device, it is natural to install an electric motor in the screen device. However, there is no technologically specific knowledge about how to utilize torque generated by the electric motor for opening and closing of the screen. It is not practical to apply structures themselves of ready-made automatic doors and automatically opening and closing screens to the screen device. It is because realization of the electric screen device must be obtained by incorporation of the electric motor into the screen device without any of big changes in the structures of the currently provided screen devices. This is the most important problem to be solved in view of versatility of the electric screen devise.

The present invention was made in the circumstances above-mentioned and has an object to provide an electric screen device which easily realizes opening and closing of a screen without prejudice of several features of the current screen devices.

Solution to Problem

To solve the problem above-mentioned, one of the aspect of the invention provides an electric screen devise which comprises,
a pair of screen mounting frame parts which are hollow and are disposed opposite to each other, at least one of the screen mounting frame parts being slidable;
a foldable and expandable screen mounted between the screen mounting frame parts;
a pair of screen guiding frame parts provided in the vicinity of two sides of the screen which are not mounted on the screen mounting frame parts, the screen guiding frame parts being receivable and drawable inside the screen mounting frame parts and having free ends at at least one end, respectively;
a tension member provided inside at least one of the screen mounting frame parts, connecting the screen guiding frame parts each other at the free ends of the screen guiding frame parts, and forming a loop;
two folded portions applying tension to the tension member by hooking the tension member, the folded portions being provided at an opposite side to a screen mounting side across the screen guiding frame parts in the screen mounting frame parts provided with the tension member; and
an electric motor causing automatically the slidable screen mounting frame part(s) to side,
wherein torque generated by rotation of a rotation shaft which the electric motor has is transmitted to the tension member,
wherein the tension member moves in a state of being hung around the folded portions,
wherein the slidable screen mounting frame part(s) automatically slides in association with movement of the tension member, and
wherein the screen automatically opens and closes.

Advantageous Effects of Invention

According to the electric screen device of the present invention can easily realize opening and closing of a screen without prejudice of several features of the current screen devices.

BRIEF DESCRIPTION OF THE DRAWINGS

FIGS. 8(a), 8(b), 8(c), 8(d), 8(d), and 8(e) are partial perspective views successively showing connecting operations of the toothed belt and the cord by the connecting structure as shown in FIG. 7, respectively.

DESCRIPTION OF EMBODIMENTS

Figure 1:
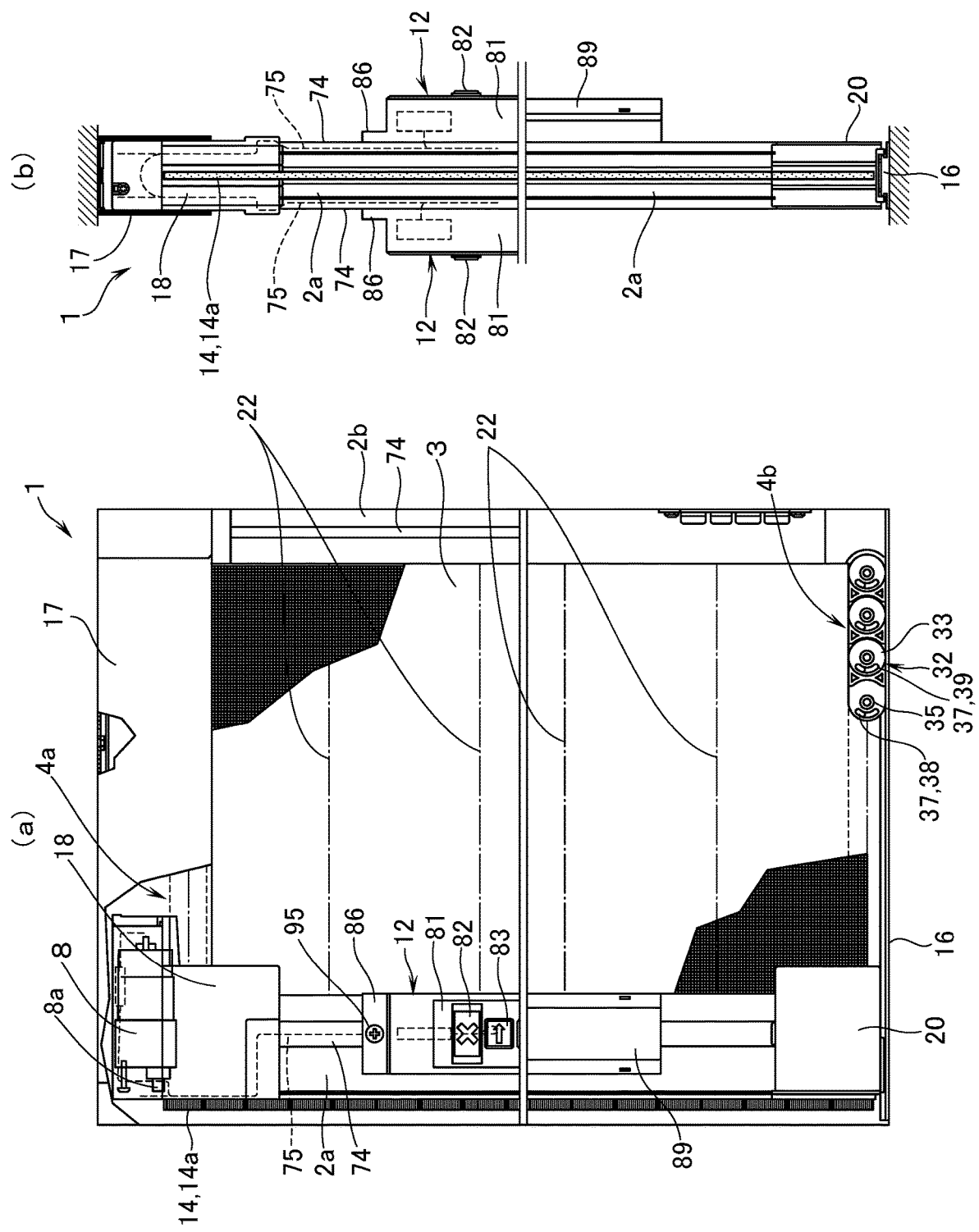
FIGS. 1(a) and 1(b) are a partially cut-off front view and a side view showing an embodiment of an electric screen device of the present invention, respectively.

FIGS. 1(a) and 1(b) are a partially cut-off front view and a side view showing an embodiment of an electric screen device of the present invention, respectively. FIGS. 2(a) and 2(b) are a front cross section and a side cross section of the electric screen device as shown in FIGS. 1(a) and 1(b), respectively.

An electric screen device 1 is provided with a pair of hollow screen mounting frame parts 2a and 2b disposed opposite to each other, a screen 3 mounted between the screen mounting frame parts 2a and 2b, and a pair of slide guiding frame parts provided in the vicinity of two sides of the screen 3 which are not mounted on the screen mounting frame parts 2a and 2b. At least one of the screen mounting frame parts 2a is slidable. The screen 3 is foldable and expandable between the screen mounting frame parts 2a and 2b. The slide guiding frame parts 4a and 4b are receivable and drawable inside at least one of the screen mounting frame parts 2a and 2b and have free ends 5a, 5b at least one end, respectively.

The electric screen device 1 is also provided with a tension member 6 provided inside the screen mounting frame part 2a and two folded portions 7a and 7b and giving tension to the tension member 6 by being hung the screen tension member 6. The tension member 6 connects the slide guiding frame parts 4a and 4b each other at free end 5a and 5b. The tension member 6 forms a loop. The folded portions 7a and 7b is provided at an opposite side to a mounting side of the screen 3 across the slide guiding frame parts 4a and 4b. Received portions of the slide guiding frame parts 4a and 4b in the screen mounting frame part(s) 2a and 2b intervene between the mounting side of the screen 3 and the opposite side with which the folded portions are provided.

The electric screen device 1 is further provided with an electric motor 8 causing the screen mounting frame part 2a to automatically slide. In the electric screen device 1, torque generated by rotation of a rotation shaft 8a which the electric motor 8 has is transmitted to the tension member 6 and the tension member 6 moves in a state of being hung around the folded portions 7a and 7b. The screen mounting frame part 2a automatically slides in association with movement of tension member 6 and the screen 3 automatically opens and closes.

As above-described, the electric screen device 1 transmits the torque generated by the rotation of the rotation shaft 8a of the electric motor 8 to the tension member 6 and causes the tension member 6 to moves in the state of being hung around the folded portions 7a and 7b. The electric screen device 1 causes the screen mounting frame part 2a to automatically slide by a movement of the tension member 6 and realizes automatic opening and closing of the screen 3. Therefore, the electric screen device 1 is realized without any of big changes in the structures of the currently provided screen devices and without prejudice of several features of the current screen devices. Accordingly, the electric screen device 1 is anticipated to be versatile.

In the electric screen device 1, it is preferable that a gear 9 is mounted on the rotation shaft 8a and the gear 9 forms the folded portion 7a which is one of the folded portions 7a and 7b. It is also preferable that at least a part of the tension member 6 is formed by a toothed belt 11 having a plurality of toothings 10 meshable with the gear 9 and the torque generated the rotation of the rotation shaft 8a of the electric motor 8 is transmitted to the toothed belt 11 through the gear 9 and the toothings 10.

Adoption of the gear 9 and the toothed belt 11 is possible to easily and surely transmit the torque generated by the rotation of the rotation shaft 8a and the electric motor 8 to the tension member 6.

In addition, it is preferable that the electric screen device 1 to be provided with controllers 12 for controlling movements of the electric motor 8, and the controllers 12 monitor electric currents during movements of the electric motor 8 and stops the electric motor 8 when the electric current is beyond a threshold set in the controllers 12.

The movement control of the controllers 12, as above-mentioned, is possible to cause the screen mounting frame part 2a to automatically stop when the screen mounting frame part 2a reaches a prescribed movement limit and to realize smooth opening and closing of the screen 3. The movement control is possible to stop sliding the screen mounting frame part 2a in case of bringing about problems to the sliding of the screen mounting frame part 2a, for example, when the screen mounting frame part 2a collides with something. Accordingly, safety of the electric screen device 1 is possibly ensured.

The electric screen device 1 is described blow in more detail.

As shown in FIGS. 1(a) and 1(b), the electric screen 1 can be installed in openings of houses or buildings, for example, such that the screen 3 is openable and closable in a direction of an opening and closing span. The screen mounting frame part 2b positioned at a right side of the electric screen device 1 is fixed on a right-side edge portion of the openings above-mentioned by a tapping screw. The screen mounting frame part 2a positioned at the electric screen device 1 is slidable in the openings similarly to the screen 3 in the direction of the opening and closing span and causes the screen 3 to expand by the sliding of the screen mounting frame part 2a in a left direction. At this time, the openings are closed by the screen 3. On the other hand, the sliding of the screen mounting frame part 2a in a right direction causes the screen 3 to be folded. At this time, the openings are opened.

A buffer material 14 such as a mohair 14a can be provided with the screen mounting frame part 2a opposite to a left-side surface portion of the openings. The mohair 14a suppresses formation of a gap between a left side of the slide mounting frame part 2a and the above-mentioned portion of the openings. Suppression of the gap formation is effective for suppressing light leakage from an exterior of the houses or buildings, wind blowing and insect invasion. The buffer material 14 can also soften collision given to the screen mounting frame part 2a during expansion of the screen 3 in case of contacting the screen mounting frame part 2a with a user(s) during entrance and exit through the openings or with some obstacles.

As shown in FIG. 2(a), a caster 15 pivoted by a rotation shaft can be provided at the lower end portion of the screen mounting frame part 2a. In this case, the caster 15 is provided such that a part of a lower end portion of the caster 15 is projected downward from the lower end of the screen mounting frame part 2a. Therefore, the caster 15 can rotate on a bottom rain 16 as shown FIGS. 1(a) and 1(b). The bottom rail 16 can be provided along a length direction of a lower end edge of the openings. In this case, the sliding of the screen mounting frame part 2a is more smoothly realized because the sliding is guided by the bottom rail 16 and in association with rotation of the caster 15.

A hollow top rail 17 of which a cross section is a U-shape can be provided at an upper end edge of the openings. In this case, an upper end portion of the screen mounting frame part 2a is inserted inside the top rail 17. Since the sliding of the screen mounting frame part is guided by the top rail 17 as well as the bottom rail 16 through the insertion, the sliding is smoother and more stabilized. The top rail 17 also suppresses exposure of an upper end and in the vicinity of the upper end of the screen 3 which are not positioned at the mounting sides of the screen mounting frame parts 2a and 2b. More specifically, exposure of the slide guiding frame part 4a drawn from the screen mounting frame part 2a to an upper side from an upper end of the screen 3 is suppressed. The top rail 17 contributes to improvement of an external appearance of the electric screen device 1.

As shown in FIG. 1(a), the electric motor 8 is provided at an upper end of the screen mounting frame part 2a. In this case, the electric motor 8 can be inserted inside the top rail 17 similarly to the upper end portion of the screen mounting frame part 2a. Insertion of the electric motor 8 inside the top rail 17 suppresses exposure of the electric motor 8. Therefore, the external appearance of the electric screen device 1 will be more improved and in addition the top rail 17 is effective for protecting the electric motor 8 from being wetted by water and dust adhesion.

In the case where the electric motor 8 is provided at the upper end of the screen mounting frame part 2a, as shown in FIG. 2(a), a receiving portion 19 having a size which enables the electric motor 8 to be horizontally disposed on the receiving portion 19 can be provided at an upper end of an upper portion guiding block 18. In this case, it is preferable for the receiving portion 19 to adopt an appropriate structure which enables the electric motor 8 to be stably disposed even both by the rotation of the electric motor 8 and by the sliding of the screen mounting frame part 2a in association with the rotation. The structure above-mentioned is not specifically limited.

In the electric device 1 as shown in FIGS. 1(a) and 1(b), the slide guiding frame part 4a is disposed at an upper side of the electric screen device 1 and the slide guiding frame part 4b at a lower side such that folding and expansion of the screen 3 is performed smoothly.

The other ends which are not free ends 5a and 5b of the slide guiding frame parts 4a and 4b are possible to be anchored ends 5c, 5d. For example, the anchored ends 5c and 5d are possible to be anchored to the upper and lower end portions of the screen mounting frame part 2b, respectively. In this case, the receiving and drawing of the slide guiding frame parts 4a and 4b are only possible for the screen mounting framepart 2a. The upper portion guiding block 18 is basically a member for guiding the receiving and drawing of the slide guiding frame part 4a in and from the screen mounting frame part 2a. Also, the screen mounting from part 2a is possible to guide the receiving and drawing of the slide guiding frame part 4b. In this case, the lower portion of the screen mounting frame part 2a can be formed by a lower portion guiding block 20. As shown in FIG. 2(a), guiding surfaces 21 curving concavely are provided with each of the upper and lower portion guiding block 18 and 20 in order to smoothly guide the receiving and drawing of the slide guiding frame parts 5a and 5b. The guiding surfaces 21 can bend the slide guiding frame parts 4a and 4b from a horizontal direction to a vertical one when the slide guiding frame parts 4a and 4b are received in and drawn from an inside of the screen mounting frame part 2a in association with the sliding of the screen mounting frame part 2a.

Figure 10:
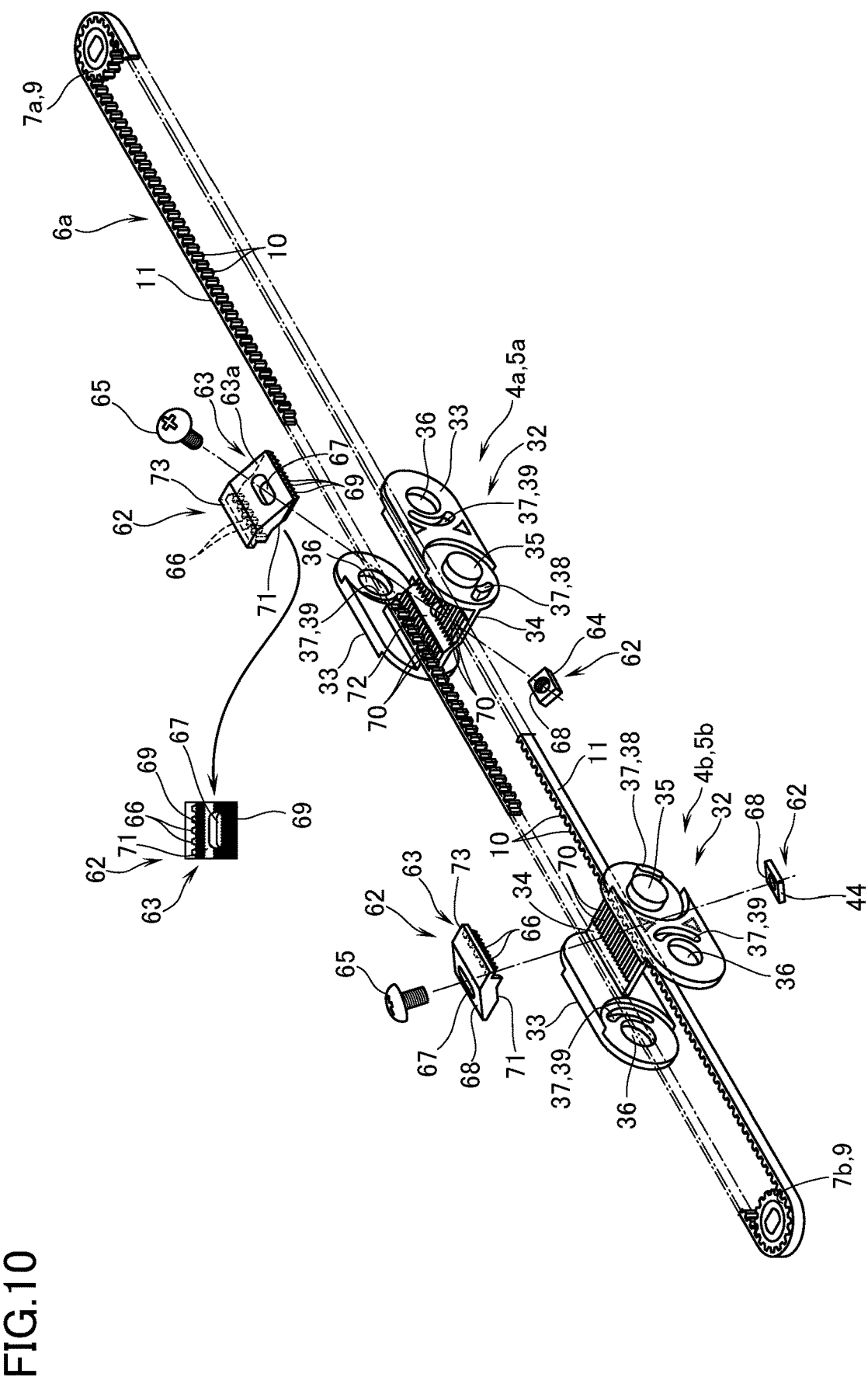
FIG. 10 is a partial perspective view showing another embodiment of the tension member applicable to the electric screen device as shown FIGS. 1(a) and 1(b), and a fixing structure for the tension member and the slide guiding frame parts.

Further, in the electric screen device 1, the gear 9 as the folded portion 7a is provided with the upper portion guiding block 18. In this case, the gear 9 can be provided at a left-side end portion of the upper portion guiding block 18 abutting on the receiving portion 19, for example, such that the gear 9 is disposed at the opposite side to the mounting side of the screen 3 across the slide guiding frame parts 4a and 4b, as above-mentioned. Similarly, the folded portion 7b is provided with the lower portion guiding block 20. Such a member having a circular shape in a planar view as a pulley is adopted to the folded portion 7b, for example, and the member above-mentioned can be pivoted by the lower portion guiding block 20 with a rotation shaft. In this case, the tension member 6 forms the loop by being hung around both gear 9 and the folded portion 7b and realizes both synchronization and an even moving migration length of the slide guiding frame parts 4a and 4b. Though the loop of the tension member 6 can be formed into a crossing shape such as the numeral 8 in the electric screen device 1, the loop above-mentioned is not necessarily limited to a crossing loop. In other words, the loop above-mentioned can be exemplified by an oval loop not crossing as shown in FIG. 10 in a front view, as mentioned below.

With respect to the screen 3, a material from which the screen 3 is made is exemplified by a cloth, a net, or a resin sheet. The screen 3 is preferably exemplified by a screen in which a plurality of pleats is formed such that folding and expansion are easily realized. In the case of the screen 3 in which a plurality of the pleats is formed, taking into the consideration of a wind pressure, for example, a reinforcing member(s) 22 which pierces the screen 3 in the horizontal direction is provided in order to improve a face strength of the expansion of the screen 3. A cord or a wire, for example, can be adopted to the reinforcing member 22. The number of the reinforcing member 22 can be appropriately decided under consideration of a horizontal length or a height of the screen 3. The number of the reinforcing member 22 is not necessarily plural. Only a reinforcing member 22 can be turned at both the left-side and the right-side ends and pierce the screen 3 at a plurality of positions in the height direction of the screen 3.

Longitudinal setting plates 23a and 23b which extend in the height direction of the screen 3 can be provided with the screen 3 at mounting sides, i.e., both the left-side and the right-side end portions. The setting plates 23a and 23b are possible to be attachable to and detachable from the screen mounting frame parts 2a and 2b. Therefore, when the screen 3 becomes soiled or broken, the screen 3 can be detached from the screen mounting frame parts 2a and 2b and be substituted a new screen for an old one. A material of the setting plates 23a and 23b is exemplified by a resin or a light metal such as aluminum.

A plurality of guiding member 24a and 24b can be vertically provided with the setting plates 23a and 23b at a constant interval. The guiding member 24a functions as a guide for drawing the reinforcing member(s) 22 and leading the reinforcing member(s) 22 downward or upward. On the other hand, the guiding member 24b can fix one end portion of the reinforcing member(s) in addition to the same function as the above-mentioned of the guiding member 24a. The number of the guiding member 24a and 24b is a same number of a plurality of the reinforcing members 22, for example. A hollow and longitudinal cover 25 of which a cross section is a U-shape can be mounted on an outside of the guiding member 24a. In this case, an inside of the cover 25 can receive the guiding members 24a and a part of the reinforcing member 22 positioned at the left side of the electric screen device 1, which is drawn from the screen 3. Therefore, the cover 25 suppresses getting entangled the part of the reinforcing member 22 above-mentioned in other members disposed inside the screen mounting frame part 2a.

In the case where the guiding member 24a is provided with the setting plate 23a, a direction changing member 27 having a first tension adjusting member 26 can be provided a lower portion of the setting plate 23a. The first tension adjusting member 26 is supported by the direction changing member 27 and is a member for turning the part of the reinforcing member 22 which is drawn from the screen 3 upward. The first tension adjusting member 26 can, for example, be a member having a columnar shape and be pivoted by the direction changing member 27 with a rotation shaft. In this case, appropriate tension can be given to the reinforcing member 22 by hanging the part of the reinforcing member 22 which is drawn from the screen 3 around a part of the columnar first tension adjusting member 26 from a lower side of the first tension adjusting member 26 and turning the reinforcing member 22 upward.

In addition, a first connector 28 can be provided with an end portion of the part of the reinforcing member 22 which is drawn from the screen 3, i.e., the other end portion of the reinforcing member 22. In this case a jump member 29 connectable with the first connector 28 can be provide inside the screen mounting frame part 2a.

As similar to the reinforcing member 22, a cord or a wire can be adopted to the jump member 29, for example, and the jump member 29 is a member capable of giving appropriate tension. One end of the jump member 29 can be connected to a part in the vicinity of the free end 5a of the slide guiding frame part 4a and the other end can be disposed at the mounting side of the screen 3 in the screen mounting frame part 2a, more specifically, in the vicinity of the cover 25. A second tension adjusting member 30 can be provided between the one end and the other end above-mentioned. The second tension adjusting member 30 is a columnar member similar to the first tension adjusting member 26. The second tension adjusting member 30 can be pivoted by a rotation shaft and, for example, can be supported at a lower end portion of the upper guiding block 18. In this case, the jump member 29 can be hung around a part of a columnar portion of the second tension adjusting member 30 from an upper side of the part above-mentioned. Therefore, a part from one end side portion to the other end side portion of the jump member 29 can be folded back downward and appropriate tension is given to the jump member 29 by such folding.

A second connector 31 is provided with the other end portion of the jump member 29. The second connector 31 is connectable to and disconnectable from the first connector 28. Various modifications are adoptable to a connecting structure of the first and second connectors 28 and 31. For example, a connecting structure putting one in the other is easy and preferable. A disconnecting structure is adopted under consideration of the substitution of the screen 3 as above-mentioned.

The folding and expansion of the screen 3 occur in association with the sliding of the screen mounting frame part 2a. When the screen 3 is folded and expanded, a length in the horizontal direction of the screen 3 which appears in the openings changes. Therefore, though a total length of the screen 3 is not changeable, a length of a part of the reinforcing member 22 which pierces the screen also changes. The connection of the first and second connectors 28 and 31 are possible to realize the receiving of a part of the reinforcing member 22 which does not pierce the screen 3 inside the screen mounting frame part 2a. Also, the connection above-mentioned can synchronize the receiving and drawing of the reinforcing member 22 with the sliding of the screen mounting frame part 2a.

One end of the jump member 29 is connected to a portion in the vicinity of the free end 5a of the slide guiding frame part 4a and therefore the receiving in and drawing from the inside of the screen mounting frame part 2a of the slide guiding frame part 4a synchronize with the sliding of the screen mounting frame part 2a. Accordingly, when the slide guiding frame part 4a is received inside the screen mounting frame part 2a, one end side of the jump member 29 is drawn downward and the other side of the jump member 29 drawn upward. As a result, the second connector 31 moves upward in the screen mounting frame part 2a and the first connector 28 connected to the second connector 31 also moves upward. The portion of the reinforcing member 22 which does not pierce the screen 3 is received inside the screen mounting frame member 2a. In the case where the slide guiding frame part 4a is drawn from the inside of the screen mounting frame part 2a, the second and first connectors 31 and 28 moves downward and the part of the reinforcing member 22 which has been received in the screen mounting frame part 2a is drawn outward from the screen mounting frame part 2a. Thus, the receiving and drawing of the reinforcing member 22 in the screen mounting frame part 2a synchronize with the sliding of the screen mounting frame part 2a. In addition, the reinforcing member 22 with a length of which commensurates with a length of the expanded screen 3 in the horizontal direction pierces the screen 3 and reinforcement of the face strength of the screen 3 by the reinforcing member 22 is properly realized.

A member formed by connection of a plurality of rigid units 32 can be preferably adopted to the slide guiding frame parts 4a and 4b, for example.

Figure 3:
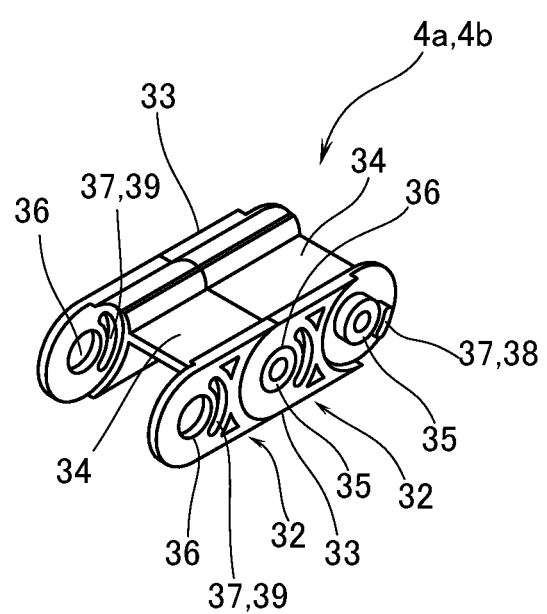
FIG. 3 is a partial perspective view of an embodiment of slide guiding frame parts of the electric screen device as shown in FIGS. 1(a) and 1(b), respectively.

FIG. 3 is a partial perspective view of an embodiment of slide guiding frame parts of the electric screen device as shown in FIGS. 1(a) and 1(b), respectively.

The rigid unit 32 is provided with a pair of side wall portions 33 disposed opposite to each other and a bridge portion 34 interconnecting the side wall portions 33 with each other. The rigid unit 32 is also provided with projections 35 protruding outward at one end portion of the side wall portion 33, through holes 36 passing through from a front face to a rear face in the other end portion of the side wall portion 33, and pivoting restricting members 37.

The rigid units 32 are connected by putting the projection 35 in the through hole 36 and thus forms the slide guiding frame parts 4a and 4b. Both rigid units 32 of adjacent two rigid units 32 are pivotable around the projection 35 as a rotation shaft and therefore the slide guiding frame parts 4a and 4b have flexibility by pivoting of the rigid unit 32. On the other hand, the slide guiding frame parts 4a and 4b maintains linearity by the pivoting restricting member 37.

For example, a shape of the side wall portion 33 can be exemplified by a plate having a contour in a plane view similar to a track of an athletic field. One end portion of the side wall portion 33 provided with the projection 35 can be formed by cutting the side wall portion 33 off in a thickness direction. In this case, outer side faces of the connected rigid units 32 can be a flush surface throughout the slide guiding frame parts 4a and 4b. A shape of the projection 35 can be, for example, exemplified by a columnar one and in this case, a shape of the through hole 36 can be a circular shape corresponding to a planar shape of the projection 35. A size of the through hole 36 is as same as or a little bigger than a contour of the projection 35.

A shape of the bridge portion 34 can be exemplified by a rectangular plate in a plane view. The bridge portion 34 can be disposed at an upper side of the pair of the side wall portions 33 so as not to contact with the bottom rail 16 as shown in FIGS. 1(a) and 1(b).

A combination of a small protrusion 38 and a slit 39 can be adopted to the pivoting restricting member 37 of the rigid unit 32, for example. In this case, the small protrusion 38 has an arc shape in a plane view and can be formed by being protruded outward from the side wall portion 33 next to the projection 35. The small protrusion 38 can also be inserted into slit 39 and in this case, the slit 39 has a crescent shape which is longer than a length of the small protrusion 38 in a plane view. The slit 39 can be formed by passing through the front side face to the rear side face of the side wall portion 33 next to the through hole 36. The pivoting restricting member 37 functions in a state that the small protrusion 38 is inserted into the slit 39. When the small protrusion 38 contacts with one end of the slit 39 between the adjacent two rigid unit 32, pivoting of the rigid units 32 are prevented. The prevention of the pivoting enables the slide guiding frame parts 4a and 4b to maintain linearity.

It is preferable to make the rigid unit 32 of a relatively hard resin under consideration of lightening the slide guiding frame parts 4a and 4b.

Any of structures of the slide guiding frame parts 4a and 4b is not specifically limited as far as the slide guiding frame parts 4a and 4b can be received and drawn inside at least one of the screen mounting frame parts 2a and 2b. The electric screen device 1, any other slide guiding frame parts than the slide guiding frame parts 4a and 4b formed by connections of a plurality of the rigid units 32 as shown in FIG. 3 could be adopted.

With respect to the tension member 6 as shown in FIGS. 2(a) and 2(b), in the case where the slide guiding frame part 4a formed by the connections of a plurality of rigid units 32 as shown in FIG. 3 is adopted to the electric screen device 1, the following structures can be adopted.

Figure 4:
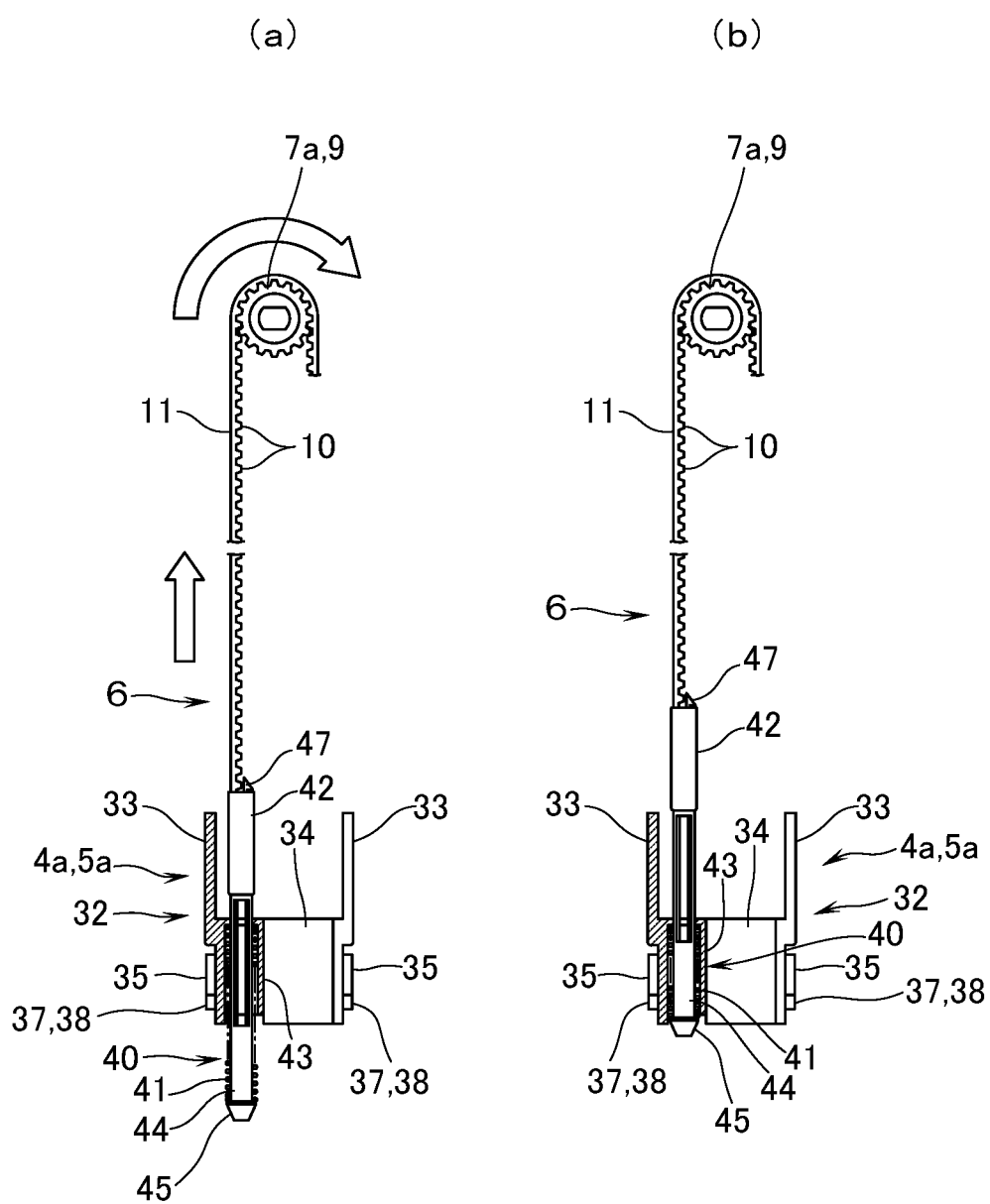
FIGS. 4(a) and 4(b) are partial front views of an embodiment of a tension member of the electric screen device as shown in FIGS. 1(a) and 1(b), respectively.

FIGS. 4(a) and 4(b) are partial front views of an embodiment of a tension member of the electric screen device as shown in FIGS. 1(a) and 1(b), respectively. More specifically, FIGS. 4(a) and 4(b) show a fixed part side of the tension member 6 on the slide guiding frame part 4a.

The toothed belt 11 forming at least a part of the tension member 6 has at a surface a plurality of toothings 10 meshable with the gear 9 provided with the rotation shaft 8a of the electric motor 8 as shown in FIG. 1. The toothed belt 11 can be hung around the gear 9 with meshing of the toothings 10 with the gear 9 and as a result, the toothed belt 11 is possible to be hung around the folded portion 7a. A material of which the toothed belt 11 is made is exemplified by a resin or a rubber which has a light weight as well as an easy formation of the toothings 10 and strength endurable torque transmitted from the electric motor 8. A width of the toothed belt 11 is appropriately determined taking into consideration of a size of the gear 9 and a length of the toothed belt 11 is appropriately determined under consideration of a sliding distance of the screen mounting frame part 2a as shown in FIGS. 1(a) and 1(b) and FIGS. 2(a) and 2(b). One end portion of the toothed belt 11 can be attached to the rigid unit 32 disposed at the free end 5a of the slide guiding frame part 4a. An attaching portion of the toothed belt 11 to the rigid unit 32 is exemplified by a surface of the bridge portion 34.

Figure 5:
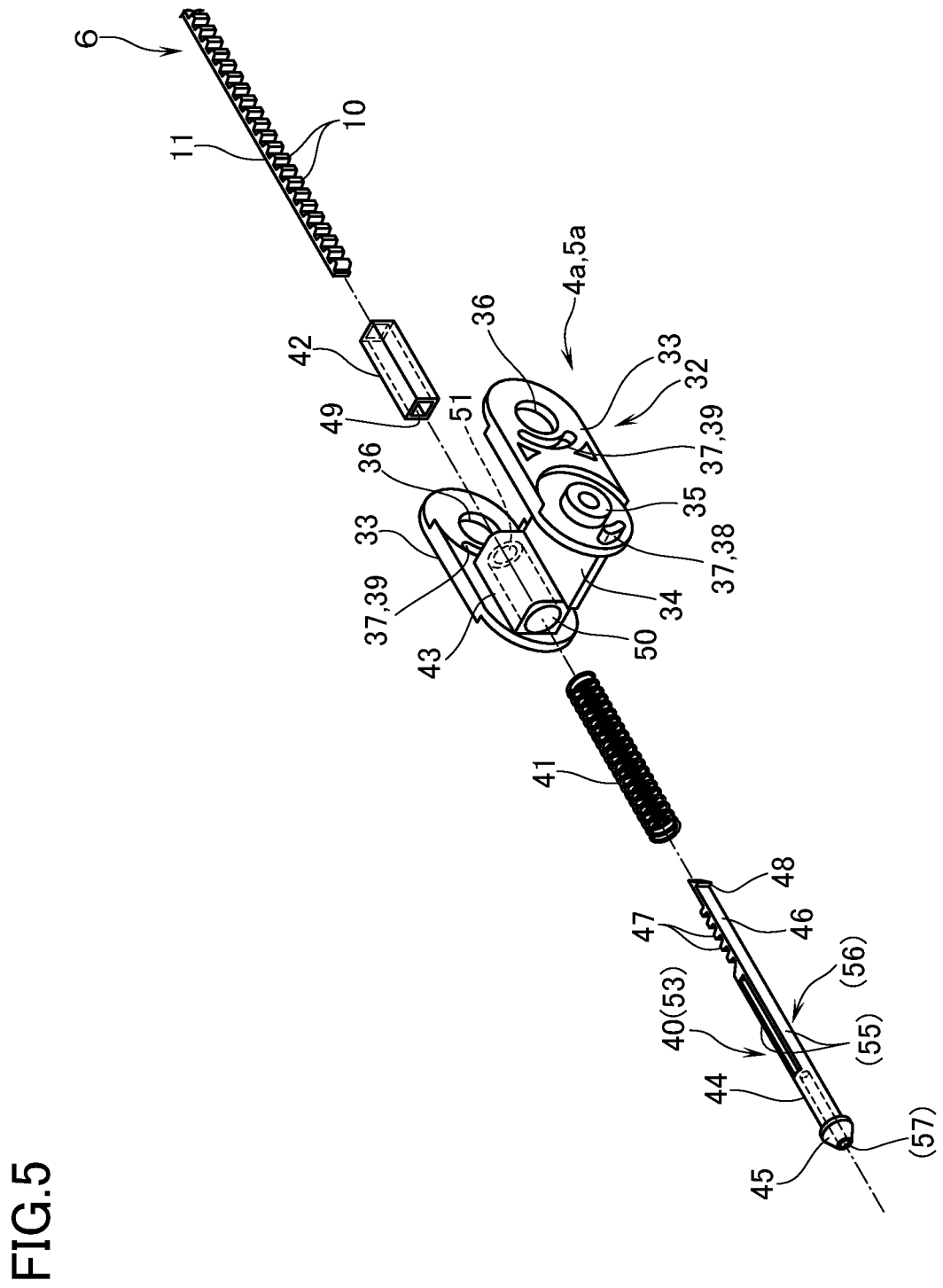
FIG. 5 is a partial deal drawing of an embodiment of a fixing structure for fixing one end portion of a toothed belt as shown in FIGS. 4(a) and 4(b) to a rigid unit disposed at a free end of the slide guiding frame part.

FIG. 5 is a partial deal drawing of an embodiment of a fixing structure for fixing one end portion of a toothed belt as shown in FIGS. 4(a) and 4(b) to a rigid unit disposed at a free end of the slide guiding frame part.

The fixing structure can contain a belt fixing member 40, a coil spring 41 as a first coil spring, a fixing jig 42 as a first fixing jig, and a coil spring holding member 43. In this fixing structure, the belt fixing member 40 has a body 44 which is finer than an inner diameter of the coil spring 41 and can dispose the coil spring 41 at a circumference of the body 44. A length of the body 44 is longer than that of the coil spring 41. A flange 45 having a cone shape, for example, which protrudes outward from the body 44 is provided with one end of the body 44. A size of the flange 45 is as same as or a little larger than a contour of the coil spring 41. A belt connecting portion 46 is provided with the other end of the body 44 and protrudes outward from the coil spring 41 when the coil spring 41 is disposed. The belt connecting portion 46 has a plate shape and is provided with a plurality of toothings 47 on one face portion in a longitudinal direction of the belt connecting portion 46. The toothings 47 are meshable with the toothings 10 of the toothed belt 11. The other face portion disposed opposite to one face portion as above-mentioned is provided with a claw 48 at the furthest position from the flange 45. The claw 48 protrudes from the other face portion, and a protruding direction is opposite to the toothings 47 and the claw 48 extends toward a side of the flange 45. The belt fixing member 40 can be made of a resin under consideration of lightening, for example, and in this case, the body 44, the flange 45, the belt connecting portion 46, the toothings 47, and the claw 48 can be formed integrally.

The fixing jig 42 is a tube-shaped member and, for example, can be a rectangular tube-shaped member. The fixing jig 42 is hollow throughout a length of the fixing jig 42. A size of a hollow portion 49 is as same as or a little larger than an integral size of a contour of the belt connecting portion 46 of the belt fixing member 40 and the toothed belt 11 by meshing the toothings 47 and 10 with each other. The fixing jig 42 is also made of a resin under consideration of lightening.

The coil spring holding member 43 is provided at a surface portion of the bridge portion 34 of the rigid unit 32. A position of the coil spring holding member 43 on the bridge portion 34 is not specifically limited and the coil spring holding member 43 can be disposed along one of the side wall portions 33 of the rigid unit 32, for example. A contour of the coil spring holding member 43 is not specifically limited and can be a rectangular shape in a cross section, for example. A hollow portion 50 having an inner diameter a little larger than an outer diameter of the coil spring 41 is formed in the coil spring holding member 43. The hollow portion 50 passes through the coil spring holding member 43 in a longitudinal direction and one end of the hollow portion 50 is entirely opened outward. On the other hand, the other end of the hollow portion 50 is a counterbore hole 51. Though a size of an opening opened outward in the counterbore hole 51 is larger than that of the belt connecting portion 46 of the belt fixing member 40, the size above-mentioned is smaller than the contour of the coil spring 41 and a size of the fixing jig 42. A cross section shape of the hollow portion 50 is not specifically limited and, for example, can be a circular shape corresponding to the contour of the coil spring 41. The coil spring holding member 43 can be integrally formed with the rigid unit 32, for example.

Fixing operations of the toothed belt 11 on the free end 5a of the slide guiding frame part 4a by using the fixing structure as above-mentioned can be performed according to the following steps.

A first, the belt fixing member 40 is passed through an inside of the coil spring 41 and the coil spring 41 is disposed around the circumference of the body 44. Subsequently, the belt fixing member 40 together with the coil spring 41 are inserted into an inside of the hollow potion 50 of the coil spring holding member 43 from the entirely opened side of the hollow portion 50. At this time, one end of the coil spring 41 positioned at the belt connecting portion 46 comes into contact with the counterbore hole 51. On the other hand, the belt connecting portion 46 of the belt fixing member 40 protrudes out of the coil spring holding member 43 through the opening of the counterbore hole 51.

The toothed belt 11 has been passed through the hollow portion 49 of the fixing jig 42 and a tip portion of the toothed belt 11 has been protruded out of the hollow portion 49. In this state, the toothings 47 of the belt connecting portion 46 protruded out of the opening of the counterbore hole 51 of the coil spring holding member 43 are meshed with the toothings 10 of the tip portion of the toothed belt 11 protruded out of the hollow portion 49 of the fixing jig 42. Then, the fixing jig 42 slides toward the coil spring holding member 43 and the claw 48 is hooked on one end of the fixing jig 42 which is positioned at further than the counterbore hole 51.

Figure 6:
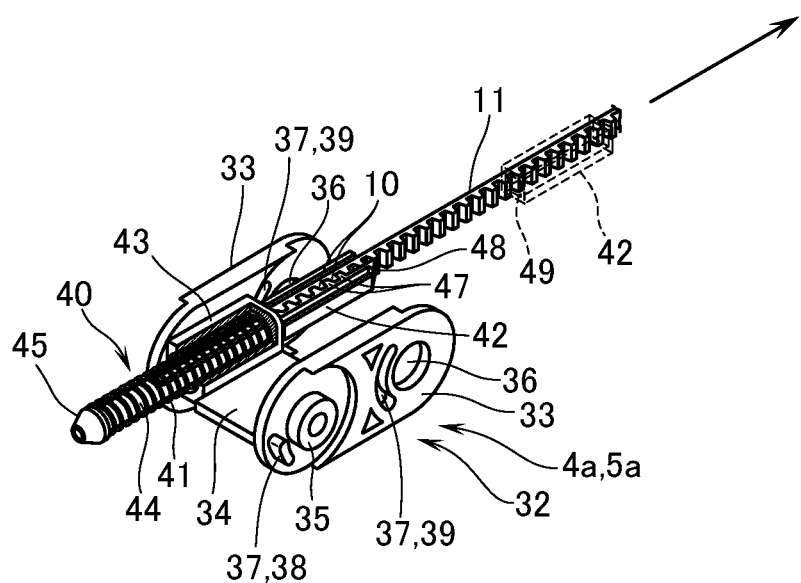
FIG. 6 is a partially cut-off perspective view showing a fixing condition of the toothed belt on the free end of the slide guiding frame parts by the fixing structure as shown in FIG. 5.

FIG. 6 is a partially cut-off perspective view showing a fixing condition of the toothed belt on the free end of the slide guiding frame parts by the fixing structure as shown in FIG. 5.

As above-mentioned, one end portion of the toothed belt 11 is fixed on the rigid unit 32 positioned at the free end 5a of the slide guiding frame part 4a by hooking of the claw 48 on one end of the fixing jig 42. In this fixing condition, one end of the coil spring 41 comes into contact with the counterbore hole 51 and the other end comes into contact with the flange 45 of the belt fixing member 40. Therefore, the coil spring 41 is held around the circumference of the body 44 of the belt fixing member 40.

Fixing of the toothed belt 11 by using the fixing structure does not need any of tools such as a driver but facilitates fixing operations. In addition, as shown FIGS. 4(a) and 4(b), when torque generated by the rotation shaft 8a by activating the electric motor 8 as shown in FIG. 1(a) is transmitted to the toothed belt 11 through the gear 9 and the toothings 10, the torque is transmitted to the slide guiding frame part 4a through the coil spring 41. In the case where the screen 3 is expanded by sliding the screen mounting frame part 2a, the gear 9 rotates in a direction as shown in FIG. 4(a) and the toothed belt 11 is drawn upward in a direction as shown in FIG. 6. A drawing force is not directly applied to the rigid unit 32 positioned at the free end 5a of the slide guiding frame part 4a. The drawing force is applied to the coil spring 41 through the flange 45 of the belt fixing member 40 and compresses the coil spring 41 as shown in FIG. 4(b). An elastic force generated in the coil spring 41 by compression at this time is applied to the other end of the coil spring holding member 43 at which the counterbore hole 51 is formed and as a result, the drawing force is indirectly applied to the slide guiding frame part 4a.

In the electric screen device 1, when torque generated by the rotation shaft 8a of the electric motor 8 is transmitted to the tension member 6, there is possibility that a large force will be applied to the tension member 6 as well as the toothed belt 11 in a moment that causes the electric motor 8 to begin to be activated and when the screen mounting frame part 2a comes contact with a left-side edge portion of the openings. The large force, for example, concentrates at a connecting potion of the toothed belt 11 and the free end 5a of the slide guiding frame part 4a as shown in FIGS. 2(a) and 2(b) and this will bring about durability problems such that as the number of opening and closing of the electric screen device 1 becomes more, the connecting portion will be likely to deteriorate and be disconnected. The fixing structure as above-mentioned is effective for solving the durability problems. As shown in FIGS. 4(a) and 4(b), since the coil spring 41 is intervened, the large force is absorbed to the coil spring 41 and converted to the elastic force, and then the elastic force is applied to the free end 5a of the slide guiding frame part 4a little by little. Accordingly, the large force which is apt to concentrate at the connecting portion can be alleviated and a connection of the tension member 6 and the free end 5a of the slide guiding frame part 4a is possible to maintain stability in spite of frequencies of opening and closing of the electric screen device 1.

As shown in FIG. 2(b), in the case where a part of the tension member 6 is formed by the toothed belt 11, a cord 52 can be adopted to the rest of the tension member 6. In this case, one end portion of the cord 52 can be connected to the other end portion which is not positioned at a connecting side of the toothed belt 11 with the slide guiding frame part 4a. The cord 52 can be substituted for another tension members containing a wire.

Figure 7:
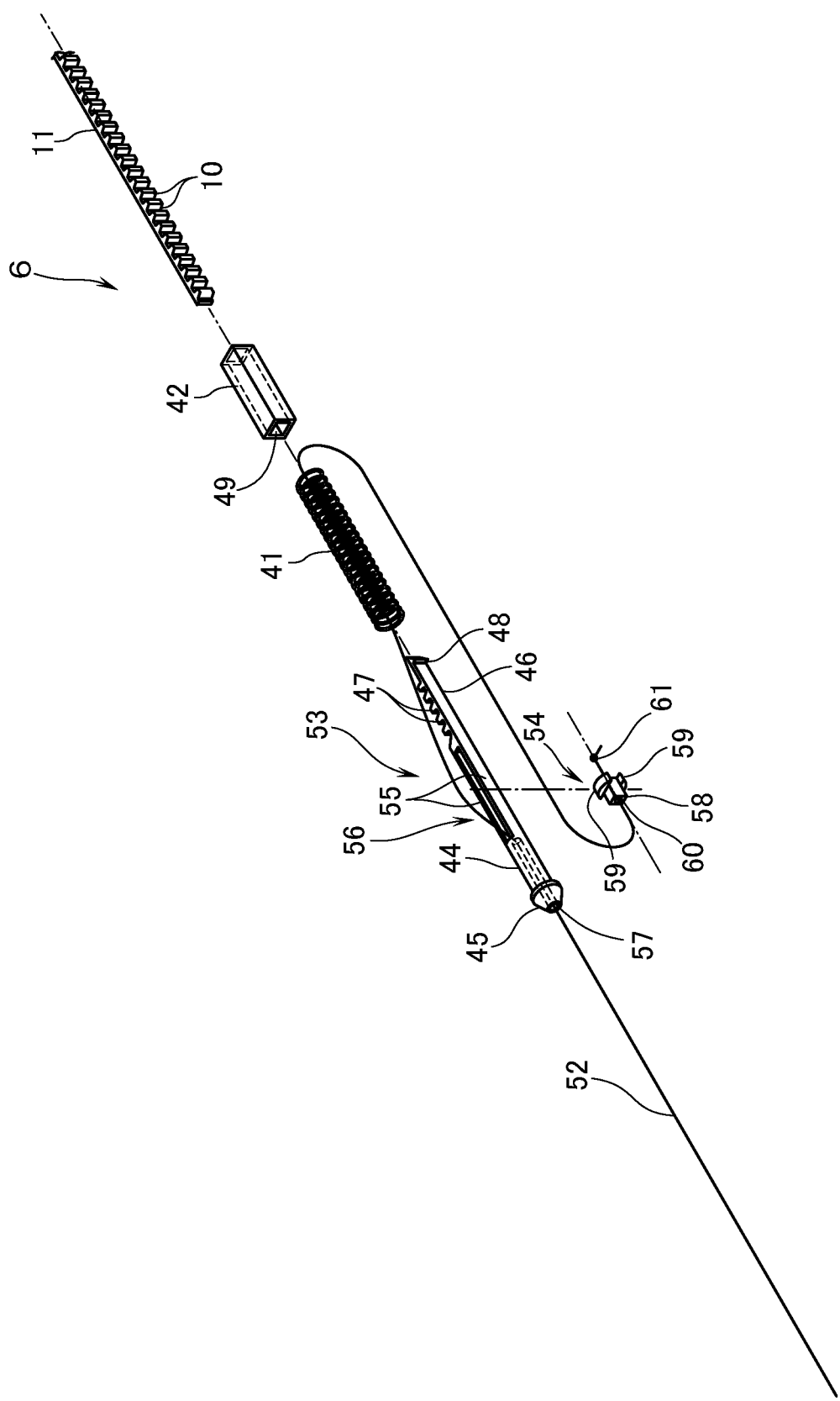
FIG. 7 is a partial deal drawing showing an embodiment of a connecting structure for connecting a cord and the other end portion of the toothed belt of the tension member as shown in FIGS. 2(a) and 2(b).

FIG. 7 is a partial deal drawing showing an embodiment of a connecting structure for connecting a cord and the other end portion of the toothed belt of the tension member as shown in FIGS. 2(a) and 2(b). In FIG. 7, members commonly used in the fixing structure as shown in FIG. 5 are given the same numerals and specific explanations of the members are omitted in the following description.

A connecting structure can contain a belt connecting member 53, the coil spring 41 as a second coil spring, the fixing jig 42 as a second fixing jig, and a clip 54, for example. In the belt connecting member 53, basic structures are common to those of the belt fixing member 40 as shown in FIG. 5. The belt connecting member 53 has the body 44, the flange 45 provided at one end portion of the body 44, and the belt connecting portion 46. On the other hand, the structures of the belt connecting member 53 are different from those of the belt fixing member 40 on the following two points. One of the different points is that the belt connecting member 53 has a two-forked portion 56. The two-forked portion 56 is made from two longitudinal pieces 55 shaped a rectangle in a plane view are disposed opposite to each other with an interval at a part of the body 44 that is directed to the belt connecting portion 46. The other of the different points is that the belt connecting member 53 has a through hole 57 formed in a part of the body 44 that extends from the flange 45 to the two-forked portion 56.

Similar to the belt fixing member 40, the belt connecting member 53 can be made of a resin and be integrally formed. In this case, the two-forked portion 56 has elasticity because of being formed by the two longitudinal pieces 55. The through hole 57 is a portion for passing the cord 52 into an inside of the two-forked portion 56 from the flange 45 and therefore a size of the through hole 57 is larger than a diameter of the cord 52.

The clip 54 has a tube-like body 58 such as a rectangular tube, and a pair of guiding pieces 59 protruding outward from the body 58 and provided on an opposite face to one end portion of the body 58. The body 58 has a hollow portion 60 both of ends of which are entirely opened. The hollow portion 60 is a portion an inside which the cord 52 is passed into and a size of the hollow 60 is larger than the diameter of the cord 52. Opposing faces to each other in the two guiding pieces 59 are a smooth plane face so that the two guiding pieces 59 can move along each of an end face of the longitudinal pieces 55 forming the two-forked portion 56 of the belt connecting member 53. End faces of the two guiding pieces 59 have a size capable of contacting with one end of the coil spring 41. The clip 54 can be also made of a resin under consideration of lightening and in this case, the clip 54 can be integrally formed.

Connecting operations of the toothed belt 11 and the cord 52 by the connecting structure above-mentioned can be performed according to the following steps.

A first, a portion positioned at a connecting side of the toothed belt 11 in the cord 52 is passed in the through hole 57 from the flange 45 of the belt connecting member 53 and is drawn to an inside of the two-forked portion 56 of the body 44. Subsequently, the portion above-mentioned is passed throughout the coil spring 41 and an inside of the hollow portion 60 of the body 58 of the clip 54, and some length of the cord 52 is drawn outward the hollow portion 60. A portion of the drawn cord 52 is tied and a size of a knot 61 is larger than that of the hollow portion 60. In this condition, the belt connecting member 53 is passed into the inside of the coil spring 41 and the coil spring 41 is disposed around the circumference of the body 44. The next steps are as shown in FIGS. 8(a), 8(b), 8(c), 8(d), and 8(e).

FIGS. 8(a), 8(b), 8(c), 8(d), and 8(d) are partial perspective views successively showing connecting operations of the toothed belt and the cord by the connecting structure as shown in FIG. 7, respectively.

As shown in FIG. 8(a), the other end of the coil spring 41 facing the flange 45 is come into contact with an end face of the flange 45 and the two-forked portion 56 of the belt connecting member 53 is protruded outward from one end of the coil spring 41 with a compression of the coil spring 41. Subsequently, the clip 54 is pushed into the inside of the two-forked portion 56. Since the two longitudinal pieces 55 forming the two-forked portion 56 has an elasticity, the two-forked portion 56 warps outward in association with pushing of the clip 54. It is preferable that each of the faces of the guiding pieces 59 of the clip 54 which are positioned opposite to the smooth plane face as above-mentioned are a curved face curving in a convex way in order to realize smooth warping.

As shown in FIG. 8(b), the clip 54 is fitted in the two-forked portion 56 and the smooth faces of the guiding pieces 59 are disposed on end faces of the longitudinal pieces 55. At this moment, the longitudinal pieces 55 recovers in an initial state. Subsequently, as shown in FIG. 8(c), the cord 52 is pulled in an arrow direction. The knot 61 is received in the two-forked portion 56 in association with pulling of the cord 52 and is come into contact with the end face of the body 58 of the clip 54. Afterward, as shown in FIG. 8(d), compression of the coil spring 41 is released. At this moment, the coil spring 41 expands so as to recover in an initial state. However, one end of the coil spring 41 is come into contact with the end faces of the two guiding pieces 59 and the other end is kept coming into contact with the end face of the flange 45 of the belt connecting member 53. Accordingly, the coil spring 41 is held around the circumference of the body 44 of the belt connecting member 53 between the flange 45 and the guiding pieces 59.

Subsequently, as shown in FIG. 8(e), the other end portion as above-mentioned of the toothed belt 11 is overlapped with the belt connecting portion 46 of the belt connecting member 53 by meshing with the toothings 10 and 47 each other. After that, the fixing jig 42 slides to the guiding pieces 59 and the claw 48 of the belt connecting portion 46 is hooked on one end of the fixing jig 42 disposed at further than the guiding pieces 59. Sliding of the fixing jig 42 and hooking of the claw 48 on the fixing jig 42 are the same as those in the fixing operations of the toothed belt 11 on the free end 5a of the slide guiding frame part 4a by the fixing structure as shown in FIG. 5. The connecting operations are accomplished by the hooking of the claw 48 on one end of the fixing jig 42.

Figure 9:
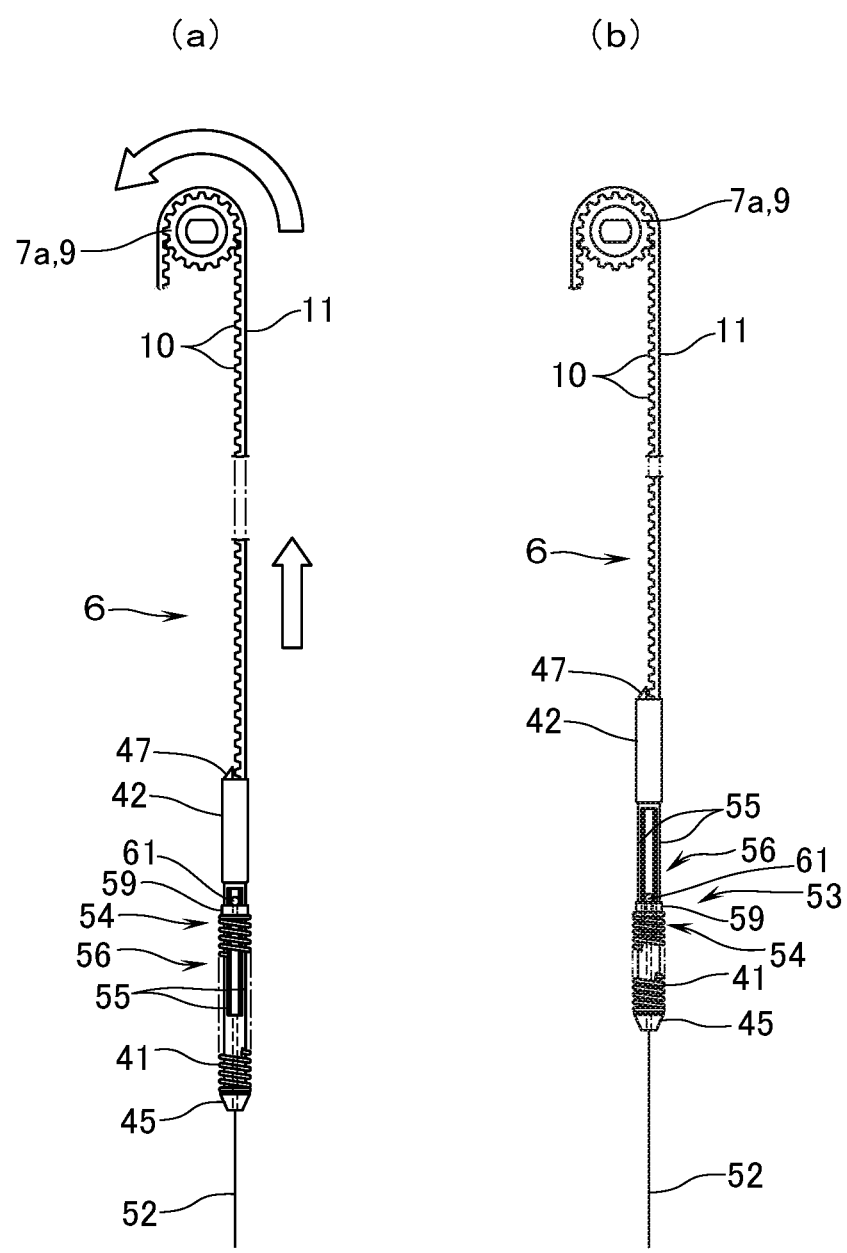
FIGS. 9(a) and 9(b) are front views partially showing another embodiment of the tension member similarly to FIGS. 4(a) and 4(b).

As is similar to the fixing structure as shown in FIG. 5, the connection of the toothed belt 11 and the cord 52 by the connecting structure does not need any of tools such as a driver and facilitates connecting operations. As shown in FIGS. 9(a) and 9(b), when the electric motor 8 as shown in FIG. 1(a) is activated and the torque generated by the rotation of the rotation shaft 8a is transmitted to the toothed belt 11 by way of the gear 9 and the toothed belt 11, the torque is transmitted to the cord 52 through the coil spring 41.

FIGS. 9(a) and 9(b) are front views partially showing another embodiment of the tension member similarly to FIGS. 4(a) and 4(b). More specifically, FIGS. 9(a) and 9(b) show a fixing portion of the tension member 6 on the slide guiding frame part 4b.

When the screen 3 is folded by the sliding of the screen mounting frame part 2a, the gear 9 rotates in an arrow direction as shown in FIG. 9(a) and the toothed belt 11 forming a part of the tension member 6 is drawn upward in an arrow direction as shown in FIG. 9(a). A drawing force at this moment is not directly applied to the cord 52. The drawing force is applied to the coil spring 41 through the flange 45 of the belt connecting member 53 and as shown in FIG. 9(b), the clip 54 moves downward along the longitudinal pieces 55 and compresses the coil spring 41. An elastic force generated in the coil spring 41 is applied to the clip 54 through the guiding pieces 59. As a result, the drawing force is indirectly applied to the cord 52.

In the electric screen device 1, when torque generated by the rotation shaft 8a of the electric motor 8 is transmitted to the tension member 6, there is possibility that a large force will be applied to the tension member 6 in a moment that causes the electric motor 8 to begin to be activated and when the screen mounting frame part 2a comes contact with the screen mounting frame part 2b. The large force concentrates at a connecting portion of the toothed belt 11 and the cord 52 as well as the connecting potion of the toothed belt 11 and the free end 5a of the slide guiding frame part 4a as shown in FIGS. 2(a) and 2(b). However, since the coil spring 41 intervenes between the toothed belt 11 and the cord 52, the large force is absorbed to the coil spring 41 and converted to the elastic force, and then the elastic force is applied to the cord 52 little by little. Accordingly, the large force which is apt to concentrate at the connecting portion can be alleviated and a connection of the toothed belt 11 and the cord 52 is possible to maintain stability in spite of the frequencies of opening and closing of the electric screen device 1. The connecting structure as above-mentioned is effective for solving the durability problems such as deterioration and releasing of the connecting portion.

On the other hand, as shown in FIGS. 2(a) and 2(b), the cord 52 is fixed on the free end 5b of the slide guiding frame part 4b at one end, is hung around the folded portion 7b and fixed on the free end 5s of the slide guiding frame part 4a at the other end which is not a side for connecting with the toothed belt 11. The tension member 6 forms a loop having a shape of numeral 8 by the toothed belt 11 and the cord 52.

In the electric screen device 1, since the belt fixing member 40 as shown in FIG. 5 and the belt connecting member 53 as shown in FIG. 7 have similar structures, as shown in FIG. 5, the belt fixing member 40 can be substituted for the belt connecting member 53. Though the fixing structure does not need the two-forked portion 56 by the two longitudinal pieces 55 or the through hole 57, if the two-forked portion 56 and the through hole 57 exist, there is almost no inconvenience for fixing of one end portion of the toothed belt 11 on the rigid unit 32 positioned at the free end 5a of the slide guiding frame part 2a. Accordingly, the number pf parts of the electric screen unit 1 is decreased and adaptation of the belt connecting member 53 to the belt fixing member 40 is effective for facilitating inventory control.

FIG. 10 is a partial perspective view showing another embodiment of the tension member applicable to the electric screen device as shown FIGS. 1(a) and 1(b), and a fixing structure for the tension member and the slide guiding frame parts.

Figure 2:
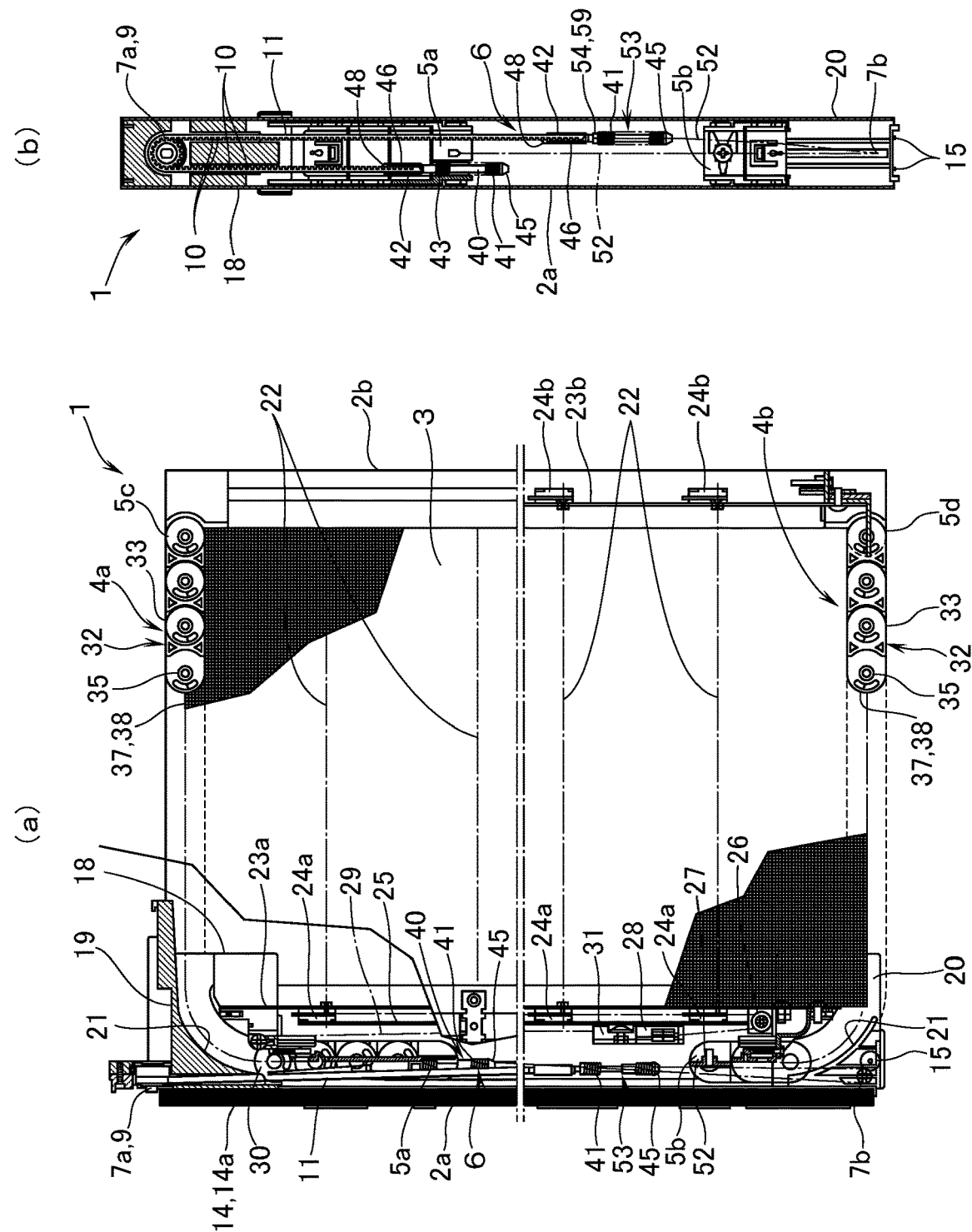
FIGS. 2(a) and 2(b) are a front cross section and a side cross section of the electric screen device as shown in FIGS. 1(a) and 1(b), respectively.

A tension member 6a as shown in FIG. 10 is applicable to the electric screen device 1 as shown in FIGS. 1(a) and 1(b). The tension member 6a is formed only by the toothed belt 11 and is substantially different from the tension member 6 as shown in FIG. 2 on a point that the cord 52 is not adopted as a structural element. In FIG. 10, members commonly used in the fixing structure as shown in FIG. 5 are given the same numerals and specific explanations of the members are omitted in the following description.

In the case where the tension member 6a formed only by the toothed belt 11 is installed in the electric screen device 1, the gears 9 are adopted to both of the two folded portions 7a and 7b. A loop formed by the tension member 6a is changed to not-crossing and an oval shape in a plane view. Therefore, another fixing structure different from that as shown in FIG. 5 is adopted in order to fix the tension member 6a, i.e., the toothed belt 11, on the free ends 5a and 5b of the slide guiding frame parts 4a and 4b. The fixing structure as above-mentioned specifically uses a fixing jig 62 for fixing the toothed belt 11 on the bridge portion 34 of the rigid unit 32 positioned at the free ends 5a and 5b. The fixing jig 62 can be exemplified by a member with which a main body 63 and a washer 64 capable of being connected by a screw 65 are provided.

A member which can clamp the toothed belt 11 together with one of the side wall portions 33 and fix the toothed belt 11 on the rigid unit 32 is adoptable to the main body 63. More specifically, the main body 63 has toothings 66 meshable with the toothings 10 of the toothed belt 11 and in the main body 63, a rear face can be put on a surface of the bridge portion 34 of the rigid unit 32 of one of the slide guiding frame parts 4a and 4b and the rear face can be put on a rear face of the rigid unit 32 of the other of the slide guiding frame parts 4a and 4b. The main body 63 has a plate shape of which a portion in the vicinity of the toothings 66 is thicker than the other potions and the toothings 66 can be formed at one side end face portion.

The washer 64 is exemplified by a member having a flat plate a surface of which can be come into contact with a surface or a rear face of the bridge portion 34. In this case, the rear face of the main body 63 is put on the surface or the rear face of the bridge portion 34 and the main body 63 and the washer 64 are connected by screwing the screw 65 from the main body 63 in the washer 64 in a state that the surface of the washer 64 comes into contact with the rear face of the bridge portion 34. The connection realizes clamping of the bridge portion 34 by the main body 63 and the washer 64, meshing of the toothings 66 and 10, and clamping of the toothed belt 11 by one of the side wall portions 33 and the main body 63. Therefore, the toothed belt 11 is fixed both on the free end 5a of the slide guiding frame part 4a and the free end 5b of the slide guiding frame part 5b. For the connection, a through hole 67 which can pass through in a front-rear direction and receive the screw 65 is formed in the main body 63 and a screw hole 68 in which the screw 65 can be screwed is formed. Similarly, the through hole 67 can pass through a front-rear direction and receive the screw 65 is also formed in the bridge portion 34. It is preferable for the through hole 67 to be a longitudinal hole extending in the same direction as a longitudinal direction of the bridge portion 34 in order to facilitate passing through of the screw 65 and to adjust tension of the toothed belt 11 as the tension member 6a.

In another fixing structure, it is preferable for the main body 63 not to expand into a side of the surface and the rear face of the bridge portion 34, which does not clamp the toothed belt 11. This is because a part of the toothed belt 11 which is not fixed on the free ends 5a and 5b of the slide guiding frame parts 4a and 4b moves in a longitudinal direction of the slide guiding frame parts 4a and 4b. Suppression of expansion of the main body 63 is effective for smooth movement of the toothed belt 11. In this case, it is exemplified that the main body 63 has an inclined portion 63a going obliquely downward from one end face portion that the toothings 66 are formed to the other end face portion positioned opposite to the one end face portion. In this case, the through hole 67 can be formed in the inclined portion 63a and the through hole 67 can be vertically formed in a surface of the inclined portion 63a or can be parallelly formed the one end face portion that the toothings 66 are formed.

It is effective for forming a plurality of toothings 69 in the rear face of the main body 63 so that a connection force can be sufficient and excellent in connection operations even by suppression because the main body 63 is a relatively small member. In this case, a plurality of toothings 70 meshable with the toothings 69 are formed in the surface or the rear face of the bridge portion 34 on which the rear face of the main body 63 is put. The connection force can be more sufficient and excellent in the connection operations by meshing of the toothings 69 and 70.

In addition, in another fixing structure as shown in FIG. 10, a rest of the rear face of the main body 63 except the part that the toothings 69 are formed can be an inclined plane 71 going obliquely downward from the one end face portion that the toothings 66 are formed to the other end face portion as above-mentioned. The toothings 69 are not necessarily formed at the inclined plane 71. In this case, an inclined plane 72 can be also formed at the surface or the rear face of the bridge portion 34 such that the inclined surface 71 can come into contact with the inclined plane 72. Gradients of the inclined planes 71 and 72 are same. Existence or nonexistence of the inclined planes 71 and 72 and existence or nonexistence of the toothings 69 and 70 of the inclined planes 71 and 72 can be appropriately choosen.

The main body 63 can be provided with a flange 73 a surface portion of which is positioned at a side of the one end face potion that the toothings 66 are formed expands outward from the other end face portion. In this case, it is preferable that the toothings 69 are not formed at a rear face of the flange 73 and the rear face can be put on the end face of the toothed belt 11 when connection as above-mentioned. A fixing force can be enlarged and be effective for the connection by putting the rea face of the flange 73 on the end face of the toothed belt 11.

FIGS. 11(a), 11(b), and 11(c) are a front view, an A-A cross section, and a B-B cross section enlargedly showing controllers as shown in FIGS. 1(a) and 1(b).

A grooved portion 74 can be formed both at a surface portion and at a rear face portion of the screen mounting frame parts 2a and 2b in the electric screen device as shown in FIGS. 1(a) and 1(b). Each of the controllers 12 can be mounted on the surface and the rea face of the screen mounting frame part 2a with use of the grooved portion 74. An electric wire electrically connecting the controllers 12 and the electric motor 8 can be wired in the grooving portion 74.

The controllers 12 can be exemplified by ones which are provided with a main board 76 on which several electric elements for controlling the movement of the electric motor 8 mounted are mounted, an electric power cable 77 supplying an electric power to the main board 76, and controlling cables 78 which are contained in an electric wire 75. The controllers 12 can be further exemplified by one having a hollow case 79 and a lid 80 partially covering an opening position at a rear face side of the case 79. In this case, as shown in FIG. 11(a), a switch cover 81 can be provided on a surface of the case 79. The switch cover 81 is provided with a stop switch 82 for stopping the sliding of the screen mounting frame part 2a, an open switch 83 for opening the electric screen device 1, and a close switch 84 for closing the electric screen device 1, for example. The switch cover 81 can be also provided with a return switch 85 for closing the electric screen device 1 after once opening. Each of the switches 82, 83, 84, and 85 can be pushed by a user's fingers and when pushed, the electric elements mounted on the main board 76 generate electric signals. The electric signals are entered the electric motor 8 through the controlling cable 78 and the electric wire 75.

The case 79 has a flange 86 at an upper end portion thereof. A through hole passing through in a front-rear direction can be formed at a center portion of the flange 86. The lid 80 can be fixed on at least two portions, i.e., an upper portion and a lower portion, of the case 79 by a screw 87. In this case, an upper end of the lid 80 is disposed above the stop switch 82 provided the switch cover 81 and a lower end portion of the lid 80 can be disposed downward from a lower end of the case 79. A lower end portion of the lid 80 can be a flange 88. Another through passing through in a front-rear direction hole can be formed at a center of the flange 88. In the case where the upper portion is disposed above the stop switch 82, a rear face portion of the case 79 positioned at an upper side from the upper end of the lid 80 can be opened and the controlling cables 78 can be drawn out of the case 79 by an opening of the case 79. The controlling cables drawn out can be an electric wire 75 by bundling.

Electric supply to the controllers 12 is realized by a rechargeable electric battery 89 in the electric screen device 1 as shown in FIGS. 1(a) and 1(b). However, the electric supply is not limited to the rechargeable electric battery 89.

Figure 12:
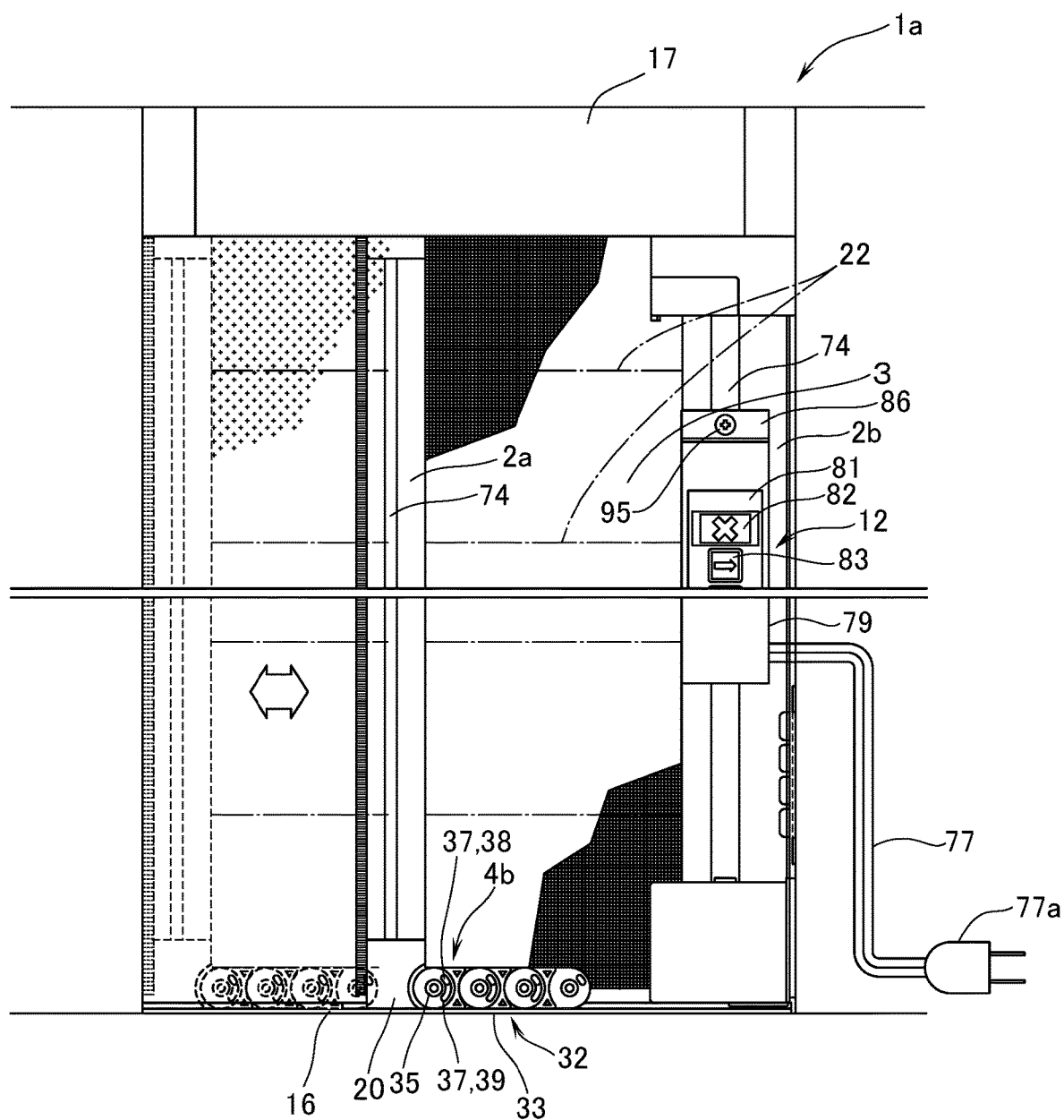
FIG. 12 is a front view showing another embodiment of the electric screen device of the present invention.

FIG. 12 is a front view showing another embodiment of the electric screen device of the present invention.

The electric supply of the controllers 12 in the electric screen device 1a as shown in FIG. 12 is performed by such a household power source. This is substantially difference from in the electric screen device 1 as shown in FIGS. 1(a) and 1(b). A plug 77a is provided at a tip of the electric power cable 77 drawn out of the case 79. In the case of the electric screen device 1a in which the controllers 12 are electrically connected with such the household power source, it is preferable that the controllers 12 are not mounted on the slidable screen mounting frame part 2a but mounted on the fixed screen mounting frame part 2b. Wiring of the electric power cable 77 in the electric screen device 1a is facilitated and suppressed that the electric power cable 77 becomes an obstacle when opening and closing of the electric screen device 1a.

In the case where the controllers are mounted on the screen mounting frame part 2b, the electric motor 8 is provided at an upper portion of the screen mounting frame part 2b as is similar to in the case of the electric screen device 1 as shown in FIG. 1. The electric motor 8 can be provided at the upper portion of the screen mounting frame part 2a. In this case, an electric wire 75 can be connected with the electric motor 8 once drawn inside the top rail 17 through the grooved portion 74.

On the other hand, in the case of performing electric power supply with the rechargeable electric battery 89 in the electric screen device 1 as shown in FIGS. 1(a) and 1(b), a position mounting the rechargeable electric battery 89 can be choosen from both faces of the surface and the rear face or only the surface of the screen mounting frame part 2a according to use condition of the electric screen device 1. At any rate, it is preferable for the rechargeable electric battery 89 to avoid being wet with water even if the battery 89 has a high waterproof property. It is also preferable that the rechargeable electric battery 89 is disposed at the beneath of or under the controllers 12 and is electrically connected. In the case where the rechargeable butter 89 is disposed at the beneath of the controllers 12 and is electrically connected, terminals 90 made of a metal which is electrically connected with the electric power cable 77 can be provided at both right and left sides of the lower end portion of the case 79. The terminals 90 are exemplified by one which has a coil-spring shape.

The terminals 90 are preferably covered by the switch cover 81 so as not to protrude from the lower end of the case 79.

Figure 11:
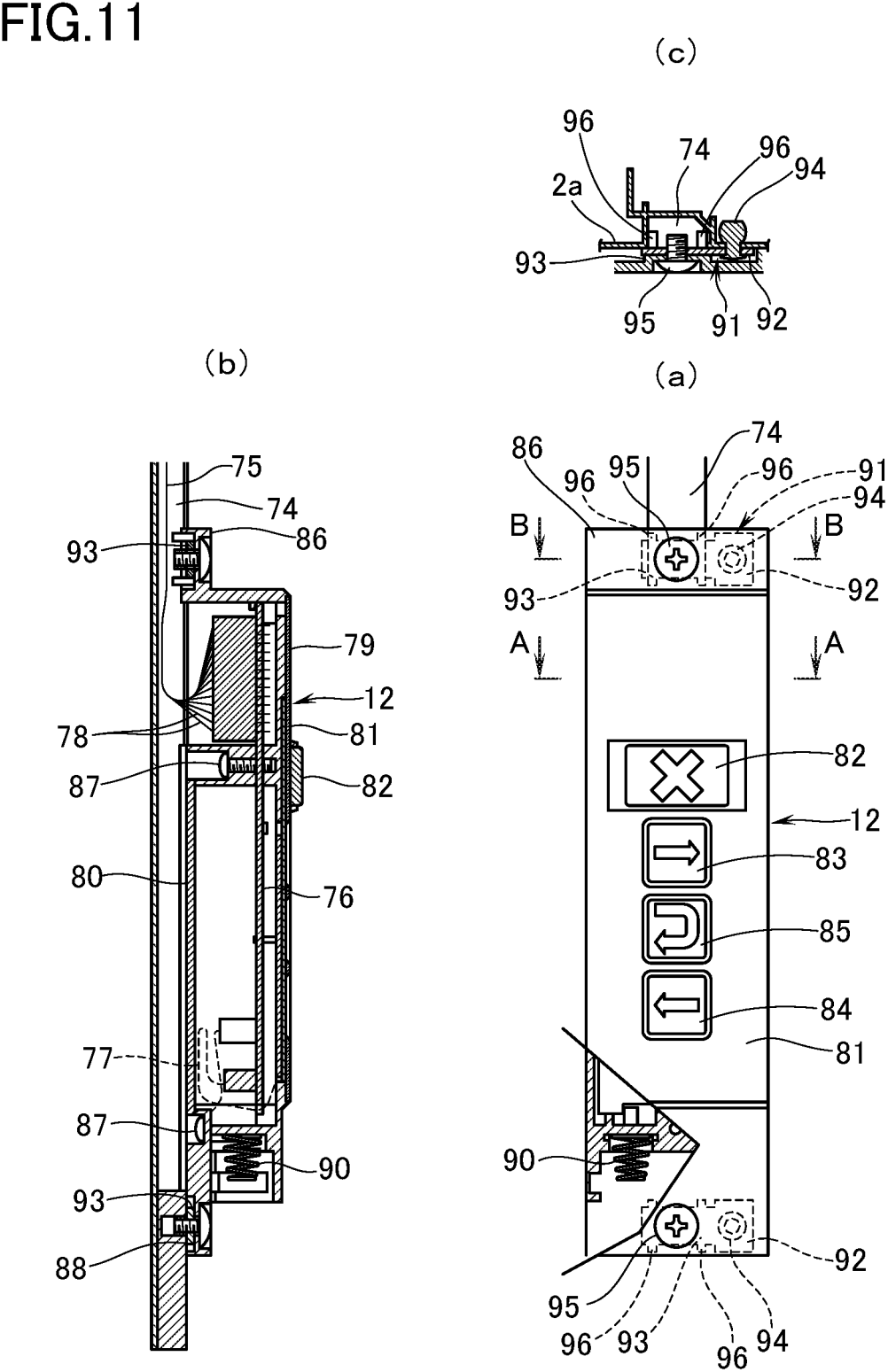
FIGS. 11(a), 11(b), and 11(c) are a front view, an A-A cross section, and a B-B cross section enlargedly showing controllers as shown in FIGS. 1(a) and 1(b).

In the case where the controllers 12 are mounted on both the surface and the rear face of the screen mounting frame part 2a or on only the surface, as shown in FIGS. 11(*a*) and 11(*c*), a mounting jig 91 can be used. A plate member is, for example, adopted to the mounting jig 91, and the mounting jig 91 ban be provided with a fixing portion 92 on the screen mounting frame part 2a and a mounting portion 93 of the controllers 12. A whole rear face of the fixing portion 92 can come into contact with a portion abutting the grooved portion 74 at both the surface and the rear face of the screen mounting frame part 2a or at only the surface. The fixing portions 92 has a through hole passing through in a front-rear direction. A whole surface of the mounting portion 93 can come into contact with a rear face of the flanges 86 and 88 of the controllers 12 and parts of a rear face of the mounting portion 93 can come into contact with nearest potions of the both the surface and the rear face of the screen mounting frame part 2a. The mounting potion 93 has a screw whole passing through in a front-rear direction.

When the controllers 12 are mounted on the screen mounting frame part 2a, openings are formed at that moment or previously at positions corresponding to the flanges 86 and 88. Subsequently, the mounting jig 91 is disposed so that the whole rear face can come into contact with the portion as above-mentioned in the screen mounting frame part 2a and that the rear face of the mounting portion 93 can come into contact with the portion as above-mentioned. Then, the through hole of the fixing portion 92 and the opening of the screen mounting frame part 2a are put together and the mounting jig 91 is fixed on the screen mounting frame part 2a by insertion of rivets 94. Further, the through holes formed in the flanges 86 and 88 are put together with the screw whole of the mounting portion 93 and the surface of the lid 80 of the controller 12 disposed with coming into contact with both the surface and the rear face of the screen mounting frame part 2a or only with the surface. Subsequently, screws 95 are screwed in the mounting portion 93 from the flanges 86 and 88. The controllers 12 are mounted on the both the surface and the rear face of the screen mounting frame part 2a or only with the surface by screwing of the screws 95. A length of the screw 95 is defined to be one which a tip of the screw 95 can stay in the grooved portion 74 after screwing.

In the fixing structure of the controllers 12 on the screen mounting frame part 2a using the mounting jig 91, the screw 95 stays in the grooved portion 74 and does not pierce an inside of the screen mounting member 2a. Since the mounting jig 91 is mounted on the screen mounting frame part 2a by the rivet 94, a mounting strength of the controllers of the screen mounting frame part 2a is sufficient in spite of using the relatively short screw 95 and detachment of the controllers 12 are suppressed. In addition, since the screw 95 stays in the grooved portion 74, the screw 95 does not become an obstacle for receiving and drawing of the slide guiding frame parts 4a and 4b.

Further, guiding pieces 96 protruding outward from the rear face of the mounting portion 93 of the mounting jig 91 can be provided at both right and left sides of the mounting portion 93. In this case, when the guiding pieces 96 are made of a resin or a metal and the guiding pieces 96 is come into contact with both right and left side end faces of the grooved portion 74 from an inner side of the grooved portion 74, the mounting jig 91 can be temporarily fixed at a fixing position using an elastic property of the guiding pieces 96. Mounting operations of the controllers 12 are facilitated. The guiding pieces 96 can be integrally formed together with the mounting jig 91 and in this case, the mounting jig 91 itself can be made of a resin or a metal.

Figure 13:
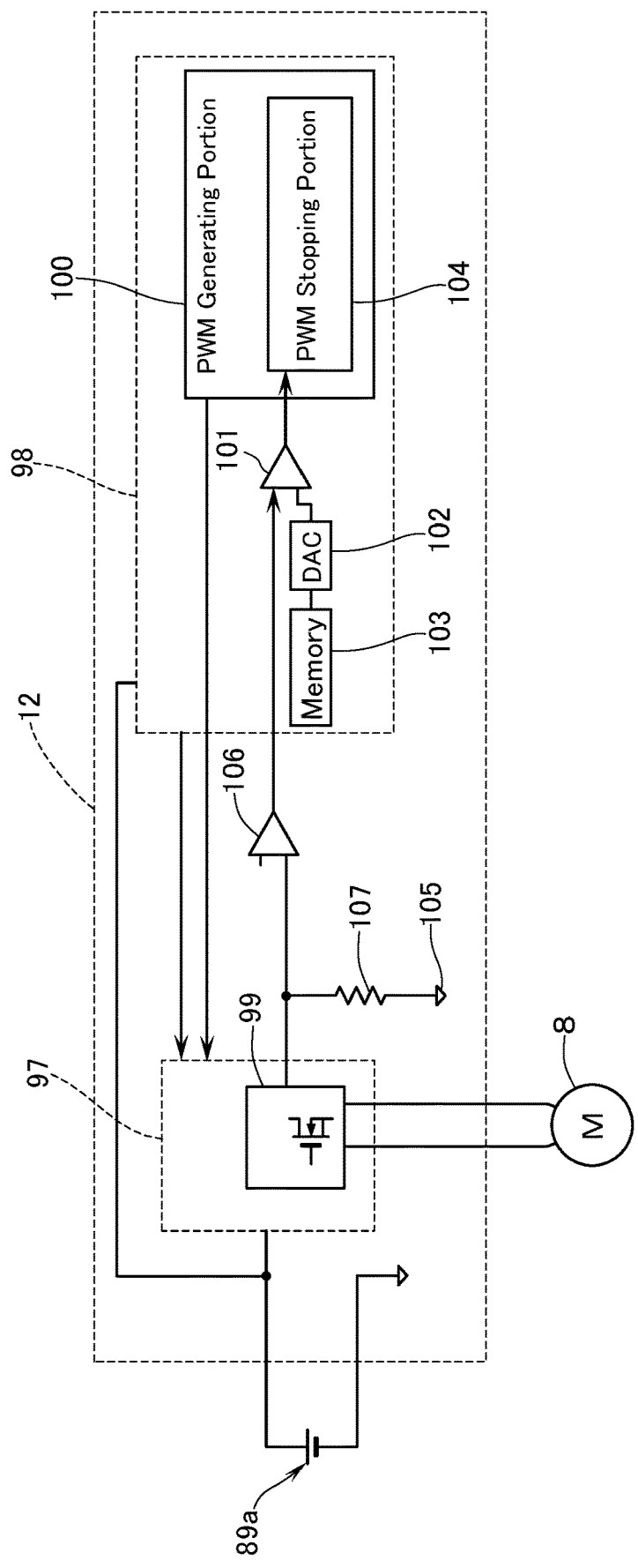
FIG. 13 is a block diagram showing an embodiment of an electric circuit which can be installed in the controllers as shown in FIGS. 1(a) and 1(b), and FIG. 12.

FIG. 13 is a block diagram showing an embodiment of an electric circuit which can be installed in the controllers as shown in FIGS. 1(*a*) and 1(*b*), and FIG. 12.

The controllers 12 have a motor driver 97 and a microcomputer 98. The motor driver 97 has an H bridge 99 and in this case, the H bridge 99 is electrically connected with the electric motor 8. The H bridge 99 can reciprocally rotate and stop the electric motor 8. The rechargeable electric battery 89 as shown in FIG. 1(*a*) and a DC power source 89a converting the household electric power to a DC can be electrically connected with the motor driver 97 and the microcomputer 98.

The microcomputer 98 has a PWM generating portion 100 which generates electric signals (hereafter, PWM signals) by modulating pulse widths, a comparator 101, a digital-analog converter (hereafter, DAC) 102, and a memory 103. The PWM generating portion 100 has a PWM stopping portion 104. The PWM generating portion 100 electrically connected with the motor driver 97. The comparator 101 compares electric voltage values of a shunt resistance 107 with a threshold previously set in the memory 103 as a digital signal and outputs compared results as an electric signal to the PWM stopping portion 104. Accordingly, the comparator 101 is electrically connected with the H bridge 99 and the PWM stopping portion 104. The shunt resistance 107 is a converter which detects by converting electric currents flowing the H bridge 99 into electric voltages and is electrically connected with a ground 105 by branching. The DAC 102 converts digital values relating a condition(s) set in the memory 103 into analog electric voltage values and outputs the analog electric voltage values to the comparator 101. Accordingly, the DAC 012 is electrically connected with the comparator 101 and the memory 103. A necessary value(s) for short braking can be set in the memory 103 of the microcomputer 98.

An operational amplifier 106 is intervened between the H bridge 99 and the comparator 101. The operational amplifier 106 is for amplifying electric voltage of the shunt resistance 107.

The controllers 12 having an electric circuit as shown in FIG. 13 can control the opening and closing of the electric screen devices 1 and 1a by controlling the electric motor 8 as follows.

A power source is supplied to the motor driver 97 and the microcomputer 98 from the DC power source 89 by connection of the DC power supply is connected with the controllers 12. When any one of the open switch 83, the close switch 84, or the return switch 85 is pushed, a rotational direction signal corresponding to a switch input are inputted from the microcomputer 98 in the motor driver 97 and the PWM signal generated by the PWM generating portion 100 is also imputed. The H bridge 99 is activated and supplies the electric power source to the electric motor 8 according to these two kinds of the electric signals. The electric motor 8 rotates positively and reversely. At that moment, a part of electric currents flowing the electric motor 8 flows the ground 105 by way of the H bridge 99 and the shunt 107. Therefore, electric voltages are generated in the shunt resistance 107 in proportion to the electric currents flowing the electric motor 8. Though the electric voltages are relatively low, the electric voltages are amplified by the operational amplifier 106 and thus amplified electric voltages are inputted in the comparator 101 as electric voltage signals. The threshold set in the memory 103 is a digital value relating to an upper limit value of an electric voltage generated in the shunt resistance 107, is converted into an analog electric voltage value by the DAC 102, and is inputted into the comparator 101. The comparator 101 compares the electric voltage values of the shunt resistance 107 that are inputted with the electric voltage value relating to the threshold and outputs an electric signal to the PWM stopping portion 104 when the electric voltage generated in the shunt resistance 107 is beyond the threshold. When the electric signal is inputted into the PWM stopping portion 104, the PWM generating portion 100 stops output of PWM signal. As a result, supply of the electric power source to the electric motor 8 is stopped. In addition, since the PWM signal is not inputted into the motor driver 97, the motor driver 97 prevents and stops positive and reverse rotations by inertia of the electric motor 8 based on the necessary value(s) for the short braking set in the memory 103 of the microcomputer 98. Though regular control of the electric motor 8 is performed based on programs previously programed in the memory 103, the controllers 12 can stop the electric motor 12 except the previous programs.

In addition, stopping of the electric motor 8 can be promptly performed and in this case, the sliding of the screen mounting frame part 2a is concurrently stopped, for example, when the electric screen devices 1 and 1a entirely opens and closes. Similarly, the electric screen devices 1 and 1a entirely opens and closes when the screen mounting frame part 2a comes into contact with such an obstacle as a user. Excessive loads applied to the screen mounting frame part 2a are suppressed and security of the electric screen devices 1 and 1a is ensured. The stopping of the electric motor 8 can be similarly performed by pushing the return switch 85 as shown in FIG. 11(a).

After the stopping of the screen mounting frame part 2a based on the electric signal outputted from the comparator 101, the regular movements of the electric screen devices 1 and 1a are recovered by the programs programed in the memory 103 of the microcomputer 98. In this case, the microcomputer 98 can be provided with a timer counting times from the stopping of the screen mounting devices 1 and 1a and memories except the memory 103 can be previously set times till recovery of the regular movements of the screen mounting frame part 2a. After the times as above-mentioned goes by, the short braking is released and the electric screen devices 1 and 1a waits for pushing of any one of the open switch 83, the close switch 84, or the return switch 85.

Figure 14:
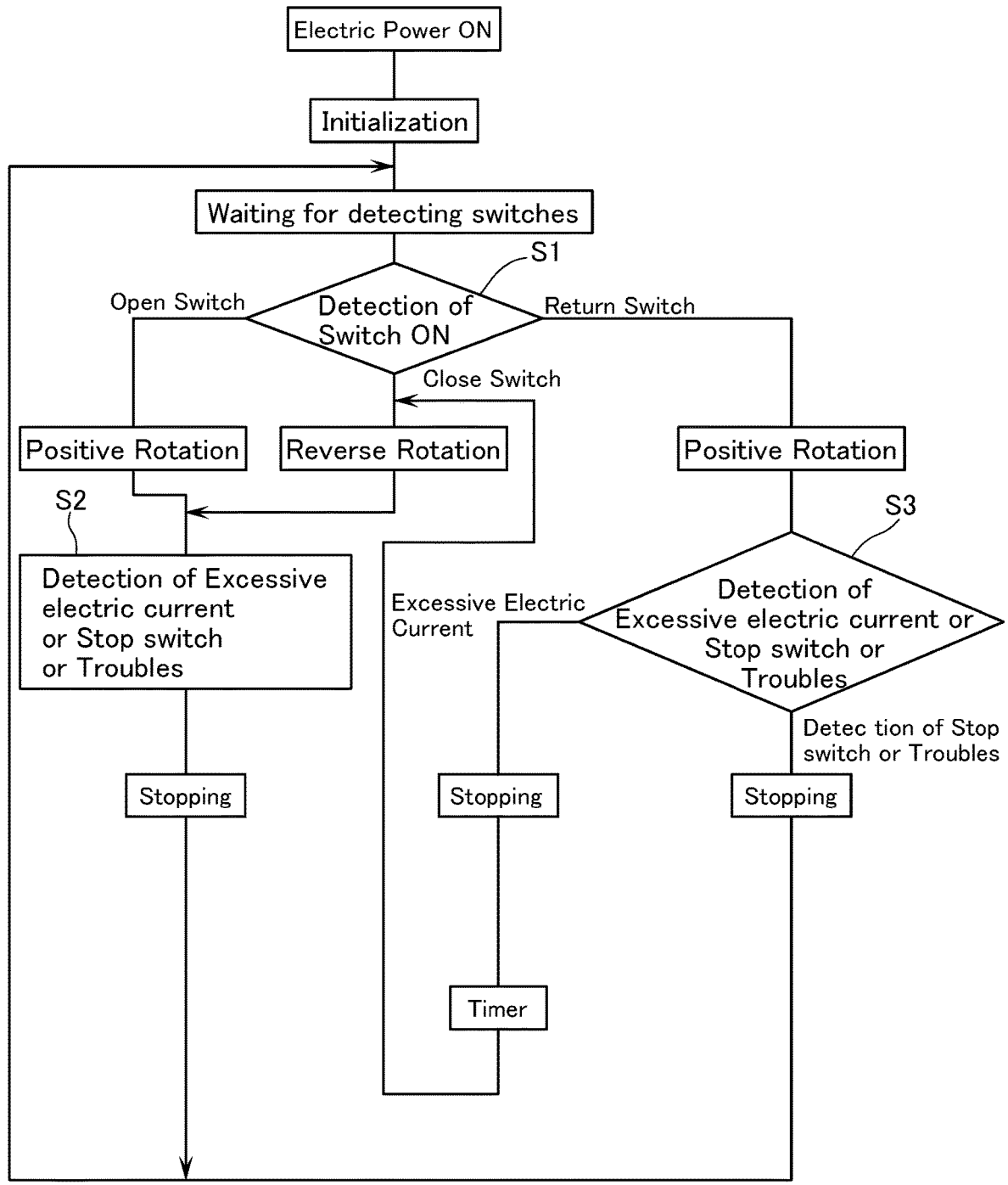
FIG. 14 is a flow chart showing an embodiment of a program which can be programed in a memory of a microcomputer as shown in FIG. 13.

FIG. 14 is a flow chart showing an embodiment of a program which can be programed in the memory 103 of the microcomputer 98 as shown in FIG. 13.

When the electric power is supplied to the electric motor 8 by electric connection of the controllers 12 with the electric power source 89a, each of electric devices provided with the controllers 12 is at first initialized and the controllers 12 wait for detecting signal from any one of the open switch 83, the close switch 84, or the return switch 85 as shown in FIG. 11(a). Subsequently, a signal from any one of the switches 83, 84 and 85 is detected in a step S1. In the case where an electric signal from the open switch 83 is detected, the electric motor 8 is positively rotated. As in a step S2, the electric circuit as shown in FIG. 13 detects excessive electric currents flowing the electric motor 8, existence or nonexistence of an electric signal input from the stop switch 82 or troubles. Decision of the troubles can be performed by such as a detection as not-flowing of the electric current in the electric motor 8, impossibility in generation of a command stopping the electric power supply to the electric motor 8 from the electric power source 89a, lowering of the electric voltage of the electric power source 89a to or below a lower limit value, or outputting of the electric signal relating to some warning from the motor driver 97. In addition, in the case where a self-decision function of the microcomputer 98 is added to the programs of the memory 103, a trouble can be also decided when detected a disorder of the microcomputer 98 itself. The electric motor 8 stops when detected excessive currents, input of the electric signal from the stop switch 82, or the troubles. After stopping the electric motor 8, the controllers 12 wait for detecting the electric signal from any one of the switches 83, 84, and 85.

Also, in the step S1, when the electric signal from the close switch 84 is detected, the electric motor 8 is caused to rotate reversely. Controls thereafter can be similar to the ones in the case of detecting the electric signal from the open switch 83.

Further, in the step S1, when the electric signal from the return switch 85 is detected, the same control as in the case of the open switch 83 can be performed. On the other hand, in this case, in a step 3, when excessive currents are detected, the electric motor 8 is stopped and at that time stopping times of the electric motor 8 are counted by the timer as above-mentioned and a control is as the same one in the case of the detecting the electric signal from the close switch 84 after passing the set times. In the step 3, when the electric signal from the stop switch 82 is detected or troubles are detected, the electric motor 8 is stopped. The controllers 12 are for detecting the electric signal from any of the switches 83, 84, and 85 after the stopping of the electric motor 8.

Though the electric screen device of the present invention is described based on the specific embodiments as above-mentioned, several modifications of structures of the screen mounting frame parts, the slide guiding frame prats, the rigid unit, the tension member, the electric motor, and the controllers can be applicable to the electric screen device of the present invention.

For example, the electric motor is not necessarily mounted on the upper end portion of the slidable screen mounting frame parts. A mounting portion of the electric motor is not limited as far as torque generated by the rotation of the rotation shaft of the electric motor can be transmitted to the tension member. For example, the electric motor can be mounted on a surface of the slidable screen mounting frame parts or a wall or something else of the house or the building that abuts the openings. In the former. A part of the tension member may be drawn outward from the slidable screen mounting frame parts. In the latter, such an appropriate power transmitting mechanism as a belt, a chain, or a speed reduction mechanism provided with a plurality of gears may be intervened between the rotation shaft of the electric motor and the tension member.

In addition, the switching input in the controllers can be changed to an input from a human body detecting sensor using infrared lights, or such the human body detecting sensor can be also added to the controllers with inputting switches.

INDUSTRIAL APPLICABILITY

The electric screen device of the present invention easily realizes opening and closing of a screen without prejudice of several features of the current screen devices and is possible to be used as a shading and diming device such as a curtain and a blind, and a mesh door and a partition.

The invention claimed is:

1. An electric screen device, comprises:
a pair of screen mounting frame parts which are hollow and are disposed opposite to each other, at least one of the screen mounting frame parts being slidable;
a foldable and expandable screen mounted between the screen mounting frame parts;
a pair of slide guiding frame parts provided in the vicinity of two sides of the screen which are not mounted on the screen mounting frame parts, the slide guiding frame parts being receivable and drawable inside the screen mounting frame parts, each of the slide guide frame parts having a free end at least one end thereof;
a tension member provided inside at least one of the screen mounting frame parts, connecting the slide guiding frame parts to each other at the free ends of the slide guiding frame parts, and forming a loop;
two folded portions for applying tension to the tension member by hooking the tension member therearound, the folded portions being provided at an opposite side to a screen mounting side across the slide guiding frame parts in the screen mounting frame parts provided with the tension member;
an electric motor causing the slidable screen mounting frame part(s) to automatically slide, and having a rotation shaft;
a gear mounted on the rotation shaft of the electric motor and forming one of the folded portions; and
a toothed belt forming a part of the tension member and having a plurality of toothings, which has a meshable shape with the gear;
wherein torque generated by rotation of the rotation shaft of the electric motor is transmitted to the toothed belt through the gear and the toothings of the toothed belt and to the tension member,
wherein the tension member moves in a state of being hung around the folded portions,
wherein the slidable screen mounting frame part(s) automatically slides in association with movement of the tension member,
wherein the screen automatically opens and closes,
wherein the electric screen device has a fixing structure for fixing the toothed belt on a rigid unit forming the slide guiding frame parts,
wherein the rigid unit is provided with a pair of side wall portions disposed opposite to each other and a bridge portion interconnecting the side wall portions with each other,
wherein the fixing structure contains a belt fixing member, a first coil spring, a first fixing jig, and a coil spring holding member,
wherein the belt fixing member has a body which is smaller than an inner diameter of the first coil spring, a length of which is longer than that of the first coil spring, and at a circumference of which can dispose the first coil spring is disposed, a flange which protrudes outward from the body and is provided with one end of the body, and a size of which is as large as or a little larger than a contour of the first coil spring, a belt connecting portion which is provided with the other end of the body, has a plate shape, is provided with a plurality of toothings, which are meshable with the toothings of the toothed belt, on one face portion in a longitudinal direction, and protrudes outward from the first coil spring when the first coil spring is disposed, and a claw which is provided at the other face portion disposed opposite to one face portion of the belt fixing member and at a furthest position from the flange, protrudes from the other face portion, a protruding direction of which is opposite to the toothings of the belt fixing member, and which extends toward a side of the flange,
wherein the first fixing jig is a tubular hollow member throughout a length thereof, a size of a hollow portion is as large as or a little larger than an integral size of a contour of the belt connecting portion of the belt fixing member,
wherein the coil spring holding member is provided at a surface portion of the bridge portion of the rigid unit positioned at the free end of each of the slide guiding frame parts, and in which a hollow portion having an inner diameter a little larger than an outer diameter of the first coil spring is formed,
wherein the hollow portion of the coil spring holding member passes through the coil spring holding member in a longitudinal direction, one end of the hollow portion of the coil spring holding member is entirely opened, and the other end of the hollow portion of the coil spring holding member is a counterbore hole,
wherein though a size of an opening opened outward in the counterbore hole is larger than that of the belt connecting portion of the belt fixing member, the size of the opening is smaller than that of the contour of the first coil spring and a size of the first fixing jig, and
wherein, in the fixing structure, the belt fixing member is passed through an inside of the first coil spring, the first coil spring is disposed around the circumference of the body, the belt fixing member together with the first coil spring are inserted into an inside of the hollow portion of the coil spring holding member, one end of the first coil spring, which is positioned at the belt connecting portion, comes into contact with the counter bore hole, the belt connecting portion of the belt fixing member protrudes out of the coil spring holding member from the opening of the counterbore hole and is passed through the hollow portion, the toothings of the toothed belt passed through the hollow portion of the first fixing jig are meshed with the toothings of the belt connecting portion protruded out of the opening of the counterbore hole of the coil spring holding member, the claw is hooked on one end of the first fixing jig which is positioned at further than the counterbore hole, the first coil spring is held around the circumference of the body of the belt fixing member, and the toothed belt is fixed on the rigid unit positioned at the free end of each of the slide guiding frame parts.

2. The electric screen device as claimed in claim 1, wherein the electric screen device has controllers for controlling movement of the electric motor,
wherein the controllers have a motor driver and a microcomputer that are connected with a DC power source, and a shunt resistance,
wherein the motor driver has an H bridge electrically connected with the electric motor,
wherein the microcomputer has a PWM generating portion generating PWM signals by modulating pulse widths, a comparator, and digital-analog convertor, and a memory,
wherein the shunt resistance is a convertor which detects electric voltages converted from electric currents flowing the H bridge, wherein the PWM generating portion has a PWM stopping portion and is electrically connected with the motor driver, wherein the comparator is electrically connected with the H bridge and the PWM stopping portion, compares electric voltage values of the shunt resistance with a threshold previously set in the memory as a digital signal, and outputs compared results as an electric signal to the PWM stopping portion, wherein the digital-analog convertor is electrically connected with the comparator and the memory, converts digital values set in the memory into analog electric voltage values, and outputs the analog electric values to the comparator, wherein a necessary value(s) for short braking stopping supply of an electric power source to the electric motor is set in the memory, and wherein, in the controllers, a part of electric currents flowing the electric motor flows the H bridge and the shunt resistance during a positive or reverse rotation of the electric motor, electric voltages are generated in the shunt resistance in proportion to the electric currents flowing the electric motor, the electric voltages are inputted in the comparator, the comparator compares the electric voltage values of the shunt resistance that are inputted with the electric voltage value relating to the threshold and outputs an electric signal to the PWM stopping portion when the electric voltage generated in the shunt resistance is beyond the threshold, when the electric signal is inputted in the PWM stopping portion, the PWM generating portion stops output of PWM signal, and supply of the electric power source to the electric motor is stopped by the necessary value(s) for short braking set in the memory.

3. The electric screen device as claimed in claim 1, wherein a rest part of the tension member except the toothed belt is formed by a cord and one end portion of the cord is connected to the other end portion which is not positioned at a connecting side of the toothed belt with the slide guiding frame part(s), wherein the electric screen device has a connection structure for connecting the cord and the toothed belt, wherein the connecting structure contains a belt connecting member, a second coil spring, a second fixing jig, and a clip, wherein the belt connecting member has a body, a flange, and a belt connecting portion, which are similar to those of the fixing structure, wherein the belt connecting member has a two-forked portion made from two longitudinal pieces, which are disposed opposite to each other at a part of the body, with an interval and a through hole formed in a part of the body that extends from the flange to the two-forked portion and a size of which is larger than a diameter of the cord, wherein the clip has a tubular body and a pair of guiding pieces, wherein one of the guide pieces is provided on a face and the other guide piece is provided on an opposite face to the face of one end portion of the body and the guide pieces protrude outward from the body, wherein the body of the clip has a hollow portion both of ends which are entirely opened and a size of the hollow portion of the body is larger than the diameter of the cord, wherein end faces of the guiding pieces have a size contacting with one end of the second coil spring, wherein a portion of the cord, which is positioned at a connecting side of the toothed belt, is passed in the through hole from the flange, drawn to an inside of the two-forked portion of the body of the belt connecting member, passed throughout the second coil spring and an inside of the hollow portion of the clip, and drawn outward from the hollow portion of the body of the bell connecting member, wherein the portion of the drawn cord is tied to form a knot a size of which is larger than that of the hollow portion of the body of the belt connecting member, and wherein, in the connecting structure, the belt connecting member is passed into an inside of the second coil spring, the other end of the second coil spring facing the flange comes into contact with an end face of the flange, the clip is pushed into the inside of the two-forked portion protruded outward from one end of the second coil spring and is fitted in the two-forked portion, the guiding pieces are disposed on end faces of the longitudinal pieces of the two-forked portion, the knot of the cord is received in the two-forked portion and comes into contact with the end face of the body of the clip, the second coil spring is held around the circumference of the body of the belt connecting member between the flange and the guiding pieces, the toothings of the toothed belt are meshed with the toothings of the belt connecting member, the claw of the belt connecting member is hooked on one end of the connecting second fixing jig disposed at a position further than the guiding pieces, and the toothed belt is connected with the cord.

4. The electric screen device as claimed in claim 3, wherein the electric screen device has controllers for controlling movement of the electric motor, wherein the controllers have a motor driver and a microcomputer that are connected with a DC power source, and a shunt resistance, wherein the motor driver has an H bridge electrically connected with the electric motor, wherein the microcomputer has a PWM generating portion generating PWM signals by modulating pulse widths, a comparator, and digital-analog convertor, and a memory, wherein the shunt resistance is a convertor which detects electric voltages converted from electric currents flowing the H bridge, wherein the PWM generating portion has a PWM stopping portion and is electrically connected with the motor driver, wherein the comparator is electrically connected with the H bridge and the PWM stopping portion, compares electric voltage values of the shunt resistance with a threshold previously set in the memory as a digital signal, and outputs compared results as an electric signal to the PWM stopping portion, wherein the digital-analog convertor is electrically connected with the comparator and the memory, converts digital values set in the memory into analog electric voltage values, and outputs the analog electric values to the comparator, wherein a necessary value(s) for short braking stopping supply of an electric power source to the electric motor is set in the memory, and wherein, in the controllers, a part of electric currents flowing the electric motor flows the H bridge and the shunt resistance during a positive or reverse rotation of the electric motor, electric voltages are generated in the shunt resistance in proportion to the electric currents flowing the electric motor, the electric voltages are inputted in the comparator, the comparator compares the electric voltage values of the shunt resistance that are inputted with the electric voltage value relating to the threshold and outputs an electric signal to the PWM stopping portion when the electric voltage generated in the shunt resistance is beyond the threshold, when the electric signal is inputted in the PWM stopping portion, the PWM generating portion stops output of PWM signal, and supply of the electric power source to the electric motor is stopped by the necessary value(s) for short braking set in the memory.

5. An electric screen device comprising, a pair of screen mounting frame parts which are hollow and are disposed opposite to each other, at least one of the screen mounting frame parts being slidable;

a foldable and expandable screen mounted between the screen mounting frame parts;

a pair of slide guiding frame parts provided in the vicinity of two sides of the screen which are not mounted on the screen mounting frame parts, the slide guiding frame parts being receivable and drawable inside the screen mounting frame parts, each of the slide guide frame parts having a free end at least one end thereof;

a tension member provided inside at least one of the screen mounting frame parts, connecting the slide guiding frame parts to each other at the free ends of the slide guiding frame parts, and forming a loop;

two folded portions for applying tension to the tension member by hooking the tension member therearound, the folded portions being provided at an opposite side to a screen mounting side across the slide guiding frame parts in the screen mounting frame parts provided with the tension member;

an electric motor causing the slidable screen mounting frame part(s) to automatically slide, and having a rotation shaft;

two gears forming the folded portions, one of which is mounted on the rotation shaft of the electric motor; and a toothed belt having a plurality of toothings, which has a meshable shape with the gears and forms the tension member;

wherein torque generated by rotation of the rotation shaft of the electric motor is transmitted to the toothed belt through one of the gears, which is mounted on the rotation shaft of the electric motor, and the toothings of the toothed belt and to the tension member, wherein the toothed belt moves in a state of being hung around the-folded portions, wherein the slidable screen mounting frame part(s) automatically slides in association with movement of the toothed belt, wherein the screen automatically opens and closes, wherein the slide guiding frame parts are formed by a plurality of rigid units having a pair of side wall portions disposed opposite to each other and a bridge portion interconnecting the side wall portions with each other, wherein the electric screen device has a fixing structure for fixing the toothed belt on the bridge portion of the rigid unit positioned at the free end of each of the slide guiding frame) parts, wherein the fixing structure has a fixing jig, wherein the fixing jig has a main body in which a through hole passing through in a front-rear direction is formed and a washer in which a screw hole is formed, wherein the main body has toothings meshable with the toothings of the toothed belt, and a rear face of the main body is put on a surface of the bridge portion of a surface of one of the slide guiding frame parts and a surface of the main body is put on a rear face of the other of the slide guiding frame parts, and wherein, in the fixing structure, the rear face of the main body of the fixing jig is put on the surface or the rear face of the bridge portion of the rigid unit of each of the slide guiding frame parts, a surface of the washer comes into contact with the rear face or the surface of the bridge portion of the rigid unit, the main body and the washer are connected by a screw screwed into the screw hole through the through hole of the main body of the fixing jig, the toothings of the main body of the fixing jig and the toothed belt are meshed with each other, and the toothed belt is fixed on the bridge portion of the rigid unit that is positioned at the free end of each of the sliding guiding frame parts.

6. The electric screen device as claimed in claim 5, wherein the electric screen device has controllers for controlling movement of the electric motor, wherein the controllers have a motor driver and a microcomputer that are connected with a DC power source, and a shunt resistance, wherein the motor driver has an H bridge electrically connected with the electric motor, wherein the microcomputer has a PWM generating portion generating PWM signals by modulating pulse widths, a comparator, and digital-analog convertor, and a memory, wherein the shunt resistance is a convertor which detects electric voltages converted from electric currents flowing the H bridge, wherein the PWM generating portion has a PWM stopping portion and is electrically connected with the motor driver, wherein the comparator is electrically connected with the H bridge and the PWM stopping portion, compares electric voltage values of the shunt resistance with a threshold previously set in the memory as a digital signal, and outputs compared results as an electric signal to the PWM stopping portion, wherein the digital-analog convertor is electrically connected with the comparator and the memory, converts digital values set in the memory into analog electric voltage values, and outputs the analog electric values to the comparator, wherein a necessary value(s) for short braking stopping supply of an electric power source to the electric motor is set in the memory, and wherein, in the controllers, a part of electric currents flowing the electric motor flows the H bridge and the shunt resistance during a positive or reverse rotation of the electric motor, electric voltages are generated in the shunt resistance in proportion to the electric currents flowing the electric motor, the electric voltages are inputted in the comparator, the comparator compares the electric voltage values of the shunt resistance that are inputted with the electric voltage value relating to the threshold and outputs an electric signal to the PWM stopping portion when the electric voltage generated in the shunt resistance is beyond the threshold, when the electric signal is inputted in the PWM stopping portion, the PWM generating portion stops output of PWM signal, and supply of the electric power source to the electric motor is stopped by the necessary value(s) for short braking set in the memory.

* * * * *